(12) United States Patent
Lund et al.

(10) Patent No.: US 11,497,154 B1
(45) Date of Patent: Nov. 15, 2022

(54) METHOD OF CONTROLLING AGRICULTURAL IMPLEMENT AND SYSTEM FOR MEASURING SOIL PROPERTIES

(71) Applicant: Veris Technologies, Inc., Salina, KS (US)

(72) Inventors: Eric Lund, Salina, KS (US); Chase Maxton, Salina, KS (US); Kyle Jensen, Salina, KS (US); Tyler Lund, Salina, KS (US); Paul Drummond, Minneapolis, KS (US)

(73) Assignee: Veris Technologies, Inc., Salina, KS (US)

( * ) Notice: Subject to any disclaimer, the term of this patent is extended or adjusted under 35 U.S.C. 154(b) by 414 days.

(21) Appl. No.: 16/888,655

(22) Filed: May 29, 2020

Related U.S. Application Data

(60) Provisional application No. 62/891,955, filed on Aug. 26, 2019, provisional application No. 62/854,277, filed on May 29, 2019.

(51) Int. Cl.
| | | |
|---|---|---|
| *A01B 63/00* | (2006.01) | |
| *A01B 15/18* | (2006.01) | |
| *A01B 79/00* | (2006.01) | |
| *A01B 63/32* | (2006.01) | |
| *A01B 23/06* | (2006.01) | |

(52) U.S. Cl.
CPC ............ *A01B 63/002* (2013.01); *A01B 15/18* (2013.01); *A01B 23/06* (2013.01); *A01B 63/32* (2013.01); *A01B 79/00* (2013.01)

(58) Field of Classification Search
CPC ..... A01B 63/111; A01B 63/002; A01B 63/32; A01B 49/06; A01B 15/18; A01B 23/06; A01B 79/00; A01C 7/201
See application file for complete search history.

(56) References Cited

U.S. PATENT DOCUMENTS

| | | | | |
|---|---|---|---|---|
| 5,841,282 | A * | 11/1998 | Christy et al. | ....... A01B 79/005 324/347 |
| 6,356,830 | B1 * | 3/2002 | Adamchuck et al. | ....................... A01B 79/005 172/720 |
| 10,321,623 | B1 * | 6/2019 | Maxton et al. | ........ G01N 21/31 |

(Continued)

*Primary Examiner* — Tara Mayo-Pinnock
(74) *Attorney, Agent, or Firm* — Jeffrey L. Thompson; Thompson Law, P.A.

(57) ABSTRACT

An agricultural implement has implement settings for soil engaging tools that are controlled based on measured temporal and long-term soil properties in a field. A controller receives data from various soil and optical sensors and provides decision support for adjusting the implement settings. The soil sensors include a square or modified square electrical array that includes two independent, isolated disk coulters running side-by-side followed by two independent, isolated soil engaging runners. One runner has an optical sensor for organic matter, and the other runner has a temperature and moisture sensor. Above-ground optical sensors can be used to measure soil and plant material ahead of and behind the soil engaging tool. The controller can provide real time alerts to an operator that adjustments to the implement settings are needed, or the adjustments can be made automatically based on operator set thresholds, factory settings, or historical individual or global grower adjustments.

18 Claims, 22 Drawing Sheets

(56) References Cited

U.S. PATENT DOCUMENTS

| | | | |
|---|---|---|---|
| 2005/0172733 A1* | 8/2005 | Drummond et al. | ........................ A01B 79/005 73/864.41 |
| 2011/0106451 A1* | 5/2011 | Christy et al. | ....... G01N 21/359 702/5 |
| 2017/0067869 A1* | 3/2017 | Lund et al. | .......... G01N 33/246 |
| 2018/0139892 A1* | 5/2018 | Knobloch et al. | ... A01B 63/002 |
| 2019/0387658 A1* | 12/2019 | Henry | .................... A01B 76/00 |

* cited by examiner

METHOD OF CONTROLLING AGRICULTURAL IMPLEMENT AND SYSTEM FOR MEASURING SOIL PROPERTIES

RELATED APPLICATIONS

This application claims the benefit of U.S. Provisional Patent Application No. 62/854,277 filed on May 29, 2019, and U.S. Provisional Patent Application No. 62/891,955 filed on Aug. 26, 2019.

BACKGROUND OF THE INVENTION

Field of the Invention

The present invention relates generally to methods and systems for measuring multiple soil properties across a field, and in particular to agricultural implements that can be adjusted on-the-go during field operations.

Description of the Related Art

Long-term soil physical and biological properties, such as texture, organic matter, topography and compaction vary within fields and during each season. Temporal properties, like soil moisture and temperature, vary similarly due to these differences and also due to rainfall patterns. The variability of both long-term and temporal properties affect optimal farming practices, whether adjusting seed rates to match soil water holding capacity or adjusting a tillage tool to create a better seedbed.

The interaction between temporal properties (e.g., moisture) and long-term properties (e.g., texture) affects optimal settings. For example, the optimal tillage for a wet sandy soil is different than for a wet clay soil; and optimal seeding rates may be different based on changes in both texture and moisture (e.g., to improve final plant stand in wet clay soils).

Tillage and planting tools now have adjustment capability to match differing conditions. These adjustments include overall and individual component depth, gang angle, shank depth relative to disk gangs, gauge wheels, and depths/pitch/aggressiveness of various attachments. Some of these commercialized tillage and planting tools allow a prescription to control these settings. However, the soil properties on which prescriptions are based are typically static and cannot respond to temporal properties like soil moisture.

Operators typically adjust their tools based on what they can visually observe from the cab. For example, an operator will typically adjust a tillage implement to a less aggressive setting when the tool is tilling relatively muddy soil, or to a more aggressive setting if weeds or surface residue are not being removed adequately, etc.

There is a need for a method and system for on-the-go sensing of soil properties, and for using those measurements to provide decision support for an operator's decisions and/or automation to adjust an implement for changing soil and ground cover conditions.

SUMMARY OF THE INVENTION

An object of the present invention is to provide an implement that monitors changing field conditions and adjusts implement settings in real time as the implement traverses a field.

A further object of the present invention is to provide an implement that measures both long-term soil physical and biological properties and temporal soil properties and uses such measurements to provide decision support for adjusting settings of the implement in real time as the implement traverses the field.

A further object of the present invention is to provide an improved system for measuring soil electrical conductivity and other soil properties, including texture, organic matter, compaction, moisture and termperature.

A further object of the present invention is to provide a controller that adjusts implement settings based on interactions between temporal and long-term soil properties, and that can be used to provide operator alerts indicating that adjustments need to be made to the implement settings, or automatic adjustments based on preset parameters or machine learning.

A further object of the present invention is to provide a control system for making changes to implement settings based upon a combination of below ground soil sensors for measuring soil properties, and above-ground optical sensors for measuring surface residue or plant material ahead of and behind the soil engaging tool.

A further object of the present invention is to provide a control system for adjusting implement settings that allows an operator to determine and set the level of each phenomenon that an adjustment needs to be made; for example, at what moisture level does the operator want to be warned that the implement should be adjusted to a shallower setting, or what percent of remaining residue is above or below the operator's desired amount so the operator can adjust the aggressiveness of the implement accordingly.

A further object of the present invention is to provide a control system that provides automatic adjustment of implement settings.

A further object of the present invention is to provide a control system for adjusting implement settings automatically based on information specific to the field, farm, and circumstances (e.g., weather forecast, etc.); and that gives the grower and operator the ability to integrate and synthesize the relevant information into their manual settings.

A further object of the present invention is to provide a control system that records a grower's manual adjustments and their corresponding soil properties on a few initial field passes and uses the recorded information to train the system to perform those adjustments automatically whenever the implement encounters those long-term and temporal soil conditions.

A further object of the present invention is to provide a control system that uses a global database to record georeferenced decisions and soil properties, and allows the data to be mined to establish a best (or most prevalent) management practice set of adjustments for each tool, component, soil type, moisture level, crop, etc.

These and other objects of the present invention are provided by an agricultural implement with implement settings for soil engaging tools that are controlled based on measured temporal and long-term soil properties in a field. A controller receives data from various soil and optical sensors and provides decision support for adjusting the implement settings. The soil sensors in one embodiment include a square or modified square electrical array that includes two independent, isolated disk coulters running side-by-side followed by two independent, isolated soil engaging runners. One runner has an optical sensor for organic matter, and the other runner has a temperature and moisture sensor. Above-ground optical sensors can be used to measure soil and plant material ahead of and behind the soil engaging tool. The controller can provide real time alerts to an operator that adjustments to the implement settings are needed, or the adjustments can be made automatically based on operator set thresholds, factory settings, or historical individual or global grower adjustments.

According to one aspect of the present invention, an agricultural implement is provided, comprising: a soil engaging tool for performing an agronomic function; a first sensor for measuring an implement setting; a second sensor for measuring a temporal property of a field as the implement traverses the field; a source of long-term soil property data; and a controller that receives data from the first and second sensors and the source of long-term soil property data and provides decision support for adjusting the implement setting based on the data from the first and second sensors and the long-term soil property data.

According to another aspect of the present invention, the combination of an agricultural implement having a soil engaging tool for performing tillage and a control system for adjusting a setting of the implement is provided, comprising: a first optical sensor arranged to measure soil and plant material ahead of the soil engaging tool; a second optical sensor arranged to measure soil and plant material behind the soil engaging tool; and a controller that receives data from the first and second optical sensors and provides decision support for the control system to adjust the implement setting based on the data.

According to another aspect of the present invention, the combination of an agricultural implement having a soil engaging tool for performing tillage and a control system for adjusting a setting of the implement is provided, comprising: a first sensor for measuring an implement setting; a second sensor for measuring a temporal property of a field as the implement traverses the field; a source of long-term soil property data; and a controller that receives data from the first and second sensors and the source of long-term soil property data and provides decision support for adjusting the implement setting based on the data from the first and second sensors and the long-term soil property data.

According to another aspect of the present invention, a method of controlling a tillage implement having a tillage tool, at least a first means for adjusting a setting of the tillage tool, at least one temporal soil property sensor, and at least one source of long term soil property data is provided. The method includes setting initial soil condition parameters for adjusting the tillage tool setting between a more aggressive tillage tool setting and a less aggressive tillage tool setting; operating the tillage implement in a machine learning mode in which the tillage tool setting is adjusted based on data from the temporal soil property sensor, the long term soil property data, and manual overrides to the tillage tool setting based on operator preferences; analyzing data from the temporal soil property sensor and the source of long term soil property data to determine conditions when manual overrides to the tillage tool setting occurred; and operating the tillage implement in an automatic mode in which the tillage tool setting is automatically adjusted based on the analyzed data and based on data from the temporal soil property sensor and the long term soil property data.

According to another aspect of the present invention, a system for measuring at least one property of soil in a field is provided, comprising: a frame; first and second disk coulters positioned side-by-side and mounted to the frame, the first and second disk coulters being electrically isolated from each other; first and second soil engaging runners positioned side-by-side and mounted to the frame to follow behind the first and second disk coulters, respectively, the first and second soil engaging runners being electrically isolated from each other and from the first and second disk coulters; and the first and second disk coulters and the first and second soil engaging runners being arranged in a rectangular pattern to provide four electrodes of a square or modified square array for measuring soil electrical conductivity.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIGS. 22 and 23 are flowcharts that illustrate a machine learning algorithm for a tillage implement according to the present invention, in which FIG. 22 depicts a machine learning mode, and FIG. 23 depicts an automatic mode for controlling the tillage implement settings.

DETAILED DESCRIPTION OF THE INVENTION

An agricultural implement with decision support to adjust implement settings according to the present invention will now be described in detail with reference to FIGS. 1 to 12 of the accompanying drawings.

Figure 1:
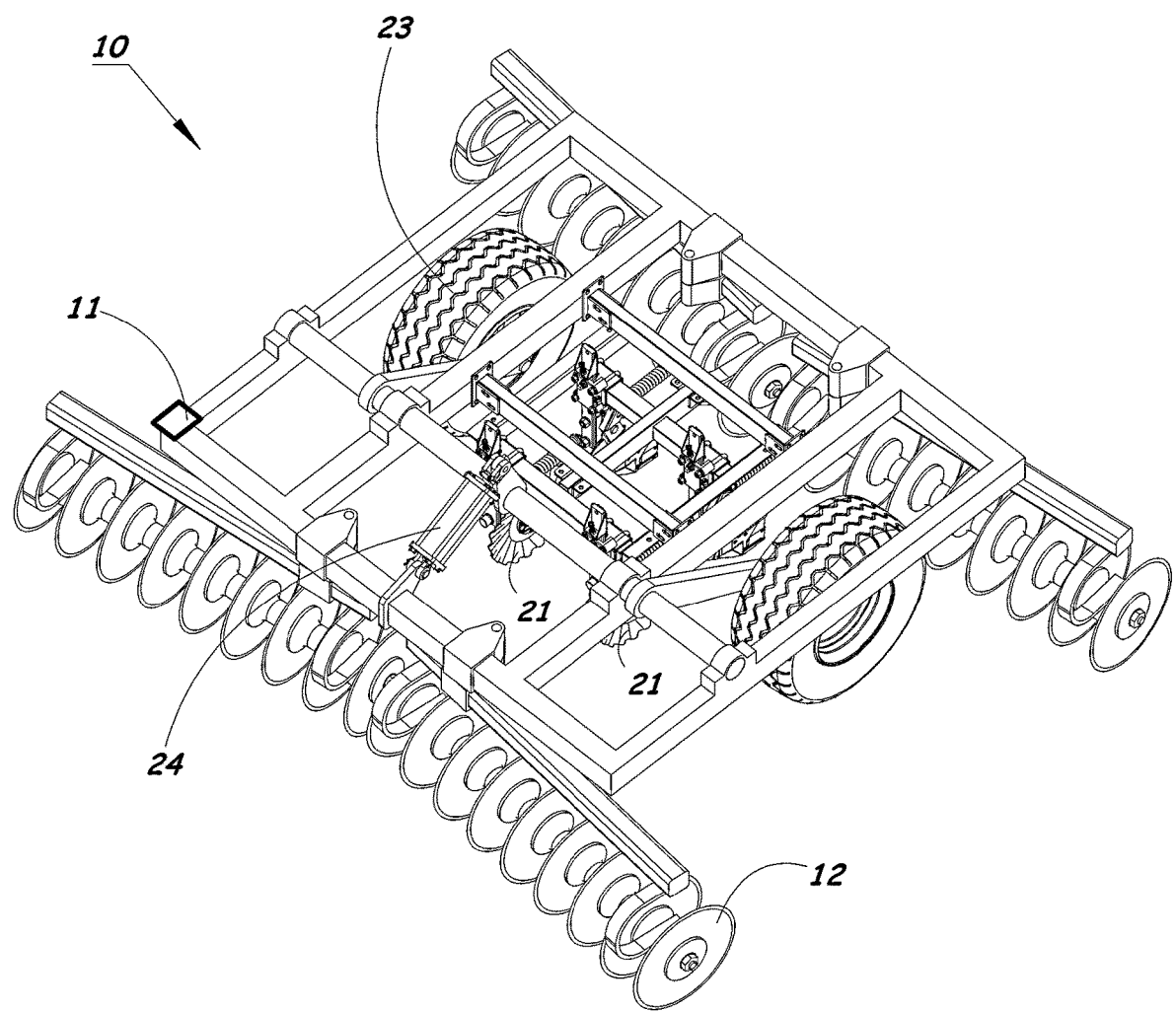
FIG. 1 is a perspective view of a tillage implement according to the present invention.
Figure 2:
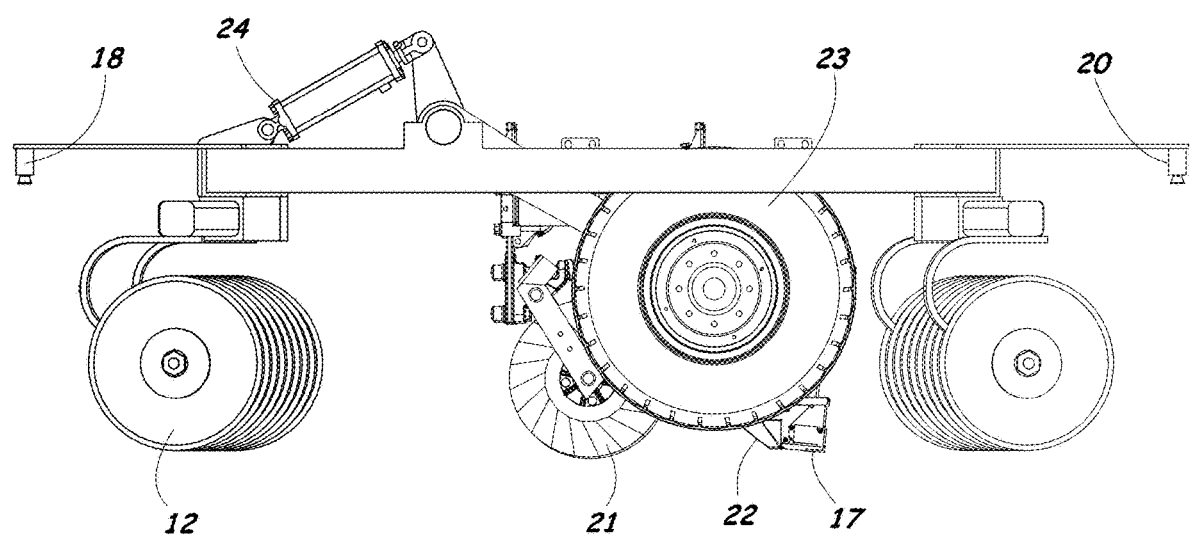
FIG. 2 is an elevation side view of the tillage implement shown in FIG. 1, including front and rear optical sensors.
Figure 3:
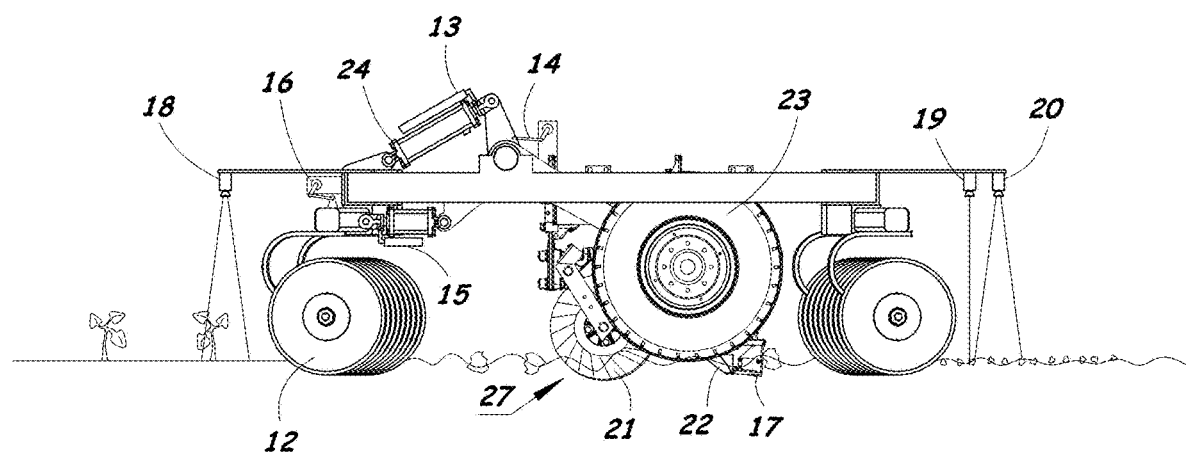
FIG. 3 is an elevation view of a tillage implement according to the present invention, including front and rear optical sensors for measuring surface residue/weeds ahead of and behind the tillage tool, an ultrasonic/laser sensor for measuring surface roughness, an array of soil EC measuring electrodes, and various potentiometer sensors for measuring and monitoring adjustable settings of the implement.
Figure 16:
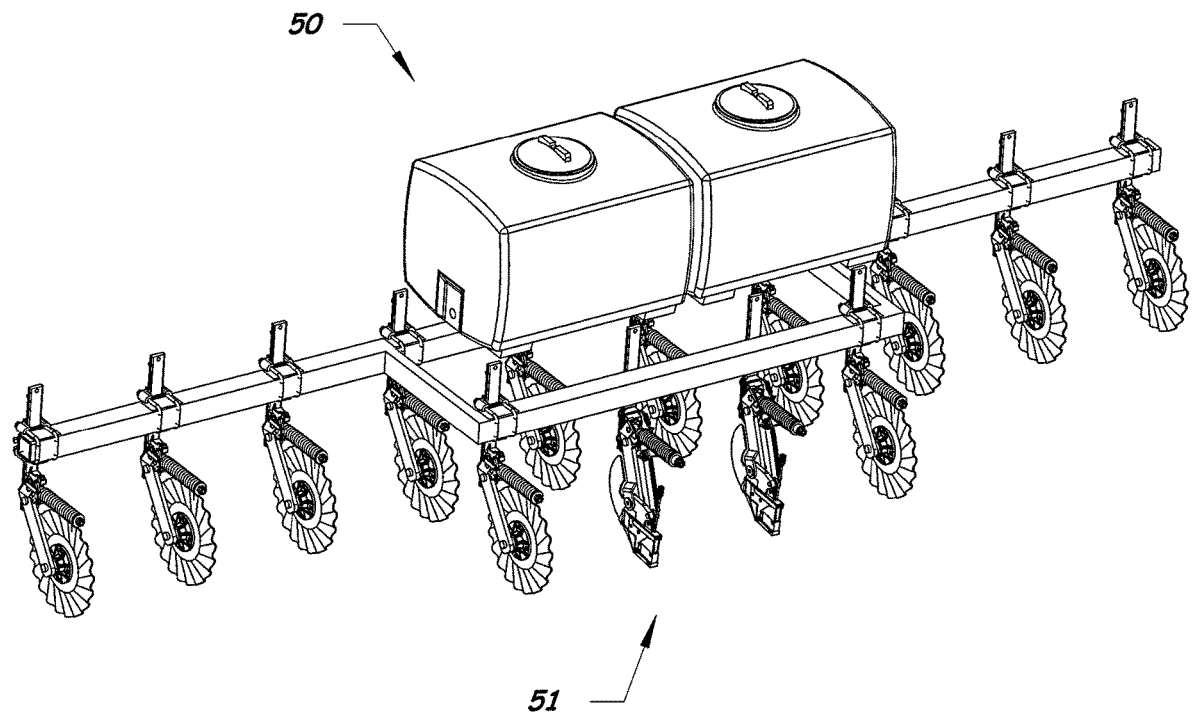
FIG. 16 is a perspective view of a fertilizer applicator equipped with soil sensors for measuring long term and temporal soil properties according to the present invention.
Figure 17:
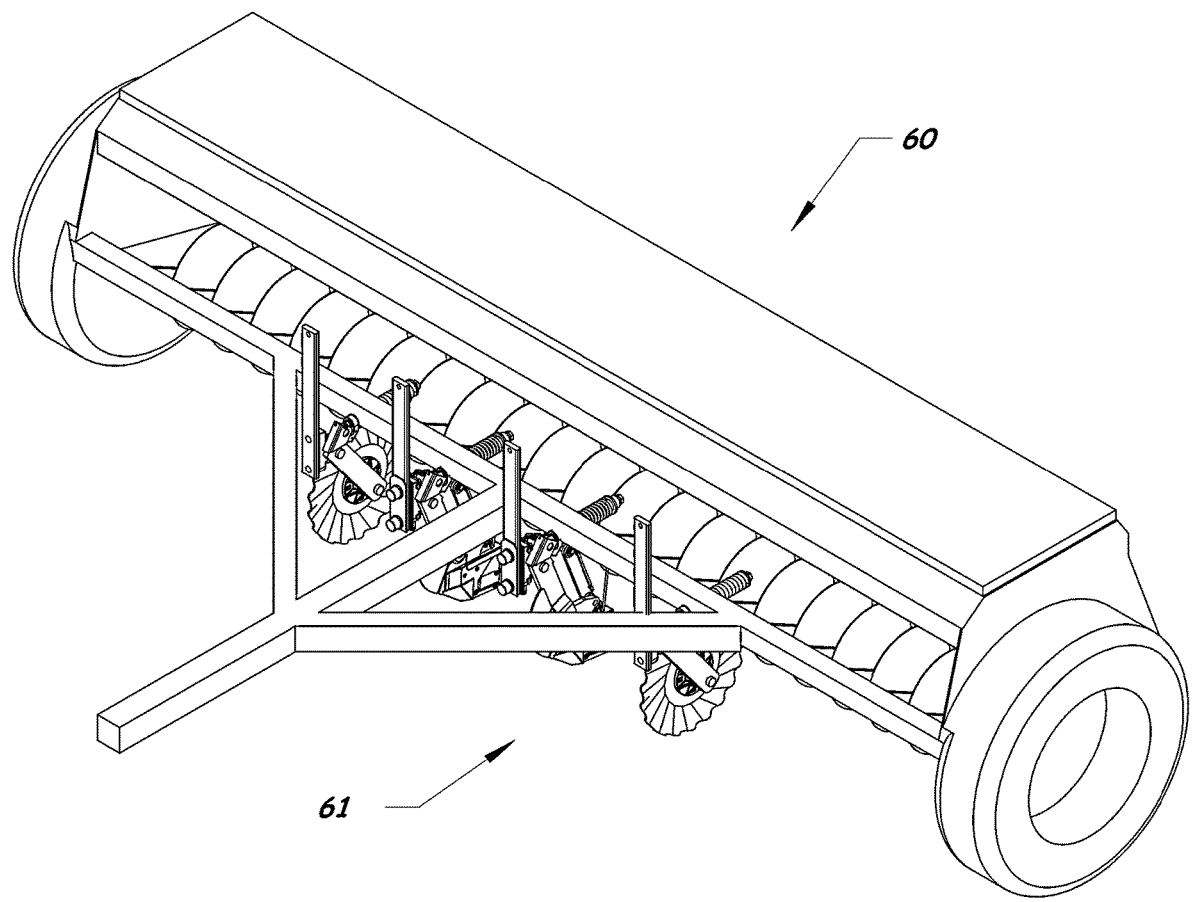
FIG. 17 is a perspective view of an agricultural seeder equipped with soil sensors for measuring long term and temporal soil properties according to the present invention.

The present invention provides an agricultural implement, such as the tillage implement 10 shown in FIGS. 1 to 3, with a control system that measures multiple soil properties and uses those measurements to advise and control equipment functions. The agricultural implement 10 can be, for example, a tillage implement (e.g., a vertical tillage soil preparation implement as shown in FIG. 1), a fertilizer applicator (FIG. 16), a seeder implement (e.g., a planter or drill as shown in FIG. 17), or other implement that benefits by having one or more implement settings adjusted in the field as operating and field conditions change. The implement 10 includes a soil engaging tool 12, such as a disk gang, gauge wheel, reel, shank, packer, furrow opener, furrow closer, etc.

As illustrated in FIG. 3, the implement 10 includes a plurality of sensors for measuring various parameters of the implement and the conditions in the field. The sensors include at least one first sensor 13, 14, 15, 16 for measuring an adjustable setting of the implement 10, at least one second sensor 17, 18, 19, 20 for measuring a temporal property of the field as the implement 10 traverses the field, and at least one third sensor 21, 22 for measuring a long-term soil property of the field as the implement 10 traverses the field. A controller 11 receives data from the first, second and third sensors 13-22 and provides decision support for adjusting the settings of the implement 10 based on the data. The controller can also use georeferenced long-term soil property data collected from a previous field operation or data gathering operation, instead of or in addition to the third sensor 21, 22, to provide a source of long-term soil property data for use in providing decision support for adjusting the implement setting.

The first sensor 13-16 is illustrated in FIG. 3 as various potentiometers for measuring gang angle and depth of the implement 10. The first sensor 13-16 can be one or more sensors arranged to measure an implement setting, such as the depth of the soil engaging tool (measured by sensors 13, 14), gang angle (measured by sensors 15, 16), speed, down pressure, implement angle, aggressiveness and pitch of the implement 10. The first sensor 13-16 can be a proximity sensor, potentiometer, ultrasonic sensor, or optical sensor that provides a direct measure of an implement setting, such as the depth of operation of the implement 10, or an indirect measure of an implement setting, such as a wheel 23 position or stroke position of a lift cylinder 24.

The second sensor 17-20 is illustrated in FIG. 3 as various sensors for measuring soil moisture and temperature, soil roughness, and surface residue/plant material. The second sensor 17-20 can be one or more sensors arranged to measure a temporal property of the field, which can be below ground or above ground. For example, the second sensor can be a sensor 17 that operates below the soil surface for measuring soil properties, such as a contact sensor 17M for measuring soil moisture, a temperature sensor 17T for sensing soil temperature, and a compaction sensor. The second sensor can also be a sensor 18-20 that operates above the soil surface for measuring field properties, such as surface residue, soil roughness, weed cover, and plant residue.

The second sensor can also have a combination of below ground and above ground components for measuring temporal field properties. For example, a pressure pin 25 (FIG. 10) or other sensor associated with a mounting assembly for a disk coulter 21 can be used for measuring a force required to press the disk coulter 21 into the soil to provide a soil compaction measurement.

Figure 8:
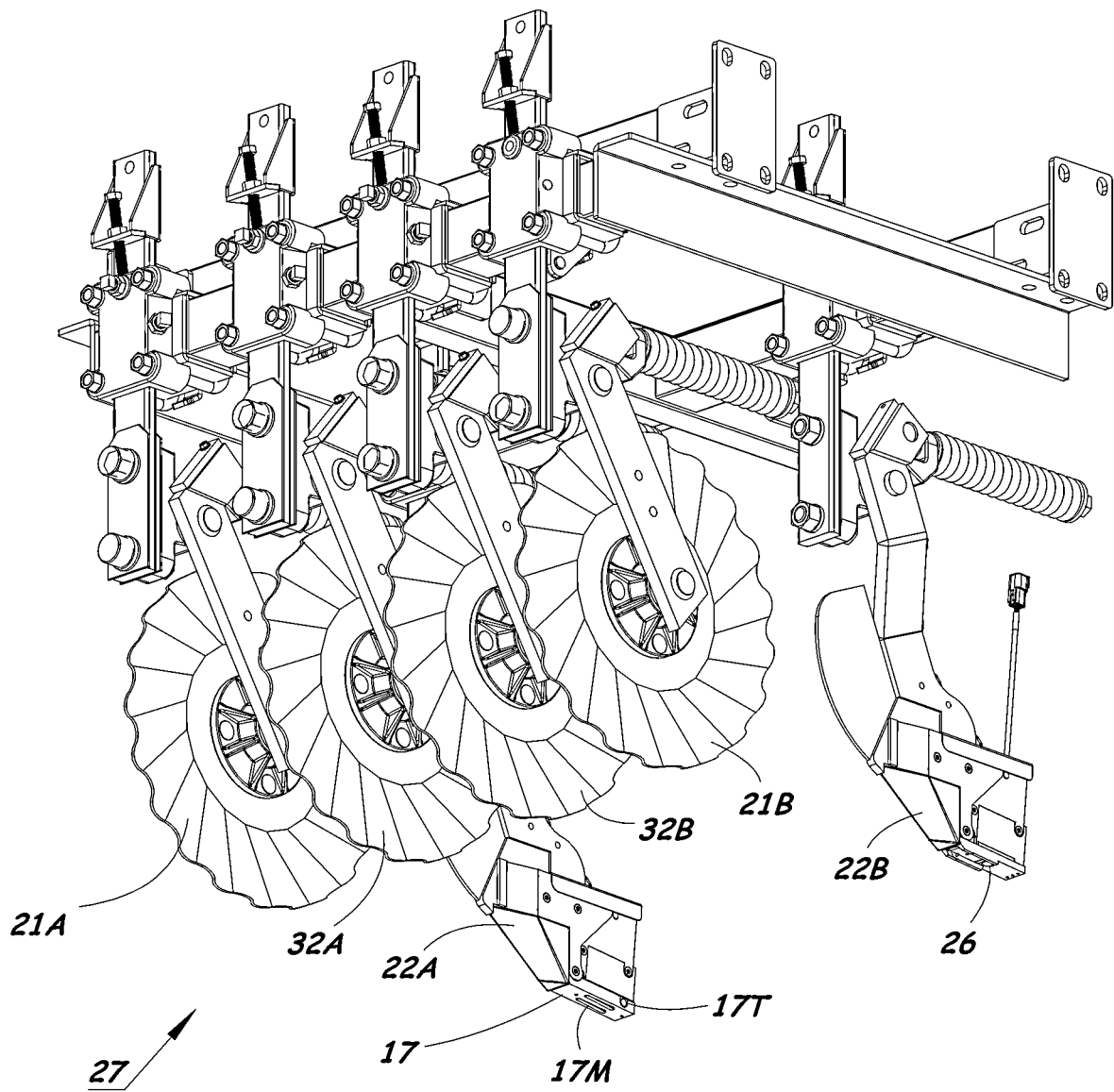
FIG. 8 is a perspective view of a square electrode array with an additional pair of electrodes for measuring soil EC at a shallow depth.

The third sensor 21, 22 is illustrated in FIG. 3 as the electrode array for measuring soil EC, and in FIG. 8 as the optical sensor 26 that measures soil organic matter. The third sensor 21, 22, 26 can be one or more sensors arranged to measure a long-term soil property of the field as the implement 10 traverses the field. The third sensor can be, for example, an electrode array 27 for performing soil electrical conductivity measurements. The third sensor 21, 22, 26 can be used to measure long term soil properties, such as soil texture, soil organic matter, and topography.

Alternatively, a source of long-term soil property data can be provided to the controller 11 as georeferenced soil data collected from a previous operation. For example, map-based soil EC and soil OM collected and stored from a previous operation can be input to the controller 11 for use with the real time data from implement sensors 13-16 and temporal property sensors 17-20 and 26 on the implement 10.

Above Ground Sensors

Figure 4:
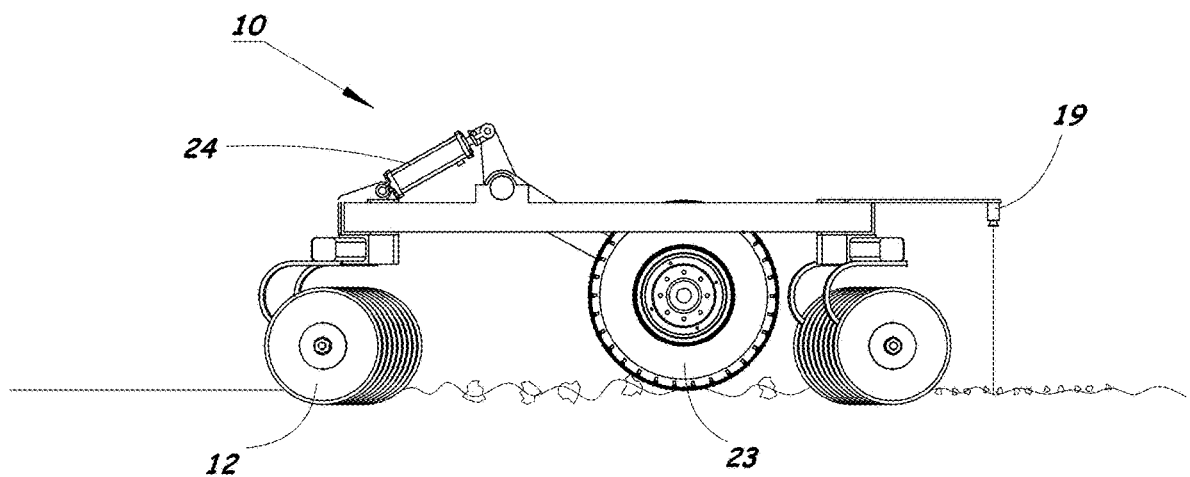
FIG. 4 is an elevation view of a tillage implement having a laser sensor mounted to a rear of the implement for measuring surface roughness behind the soil engaging tools.

As illustrated in FIG. 4, the implement 10 can include a laser 19 aimed at the field surface behind the tillage tools on the implement to determine surface roughness and cloddiness.

Figure 5:
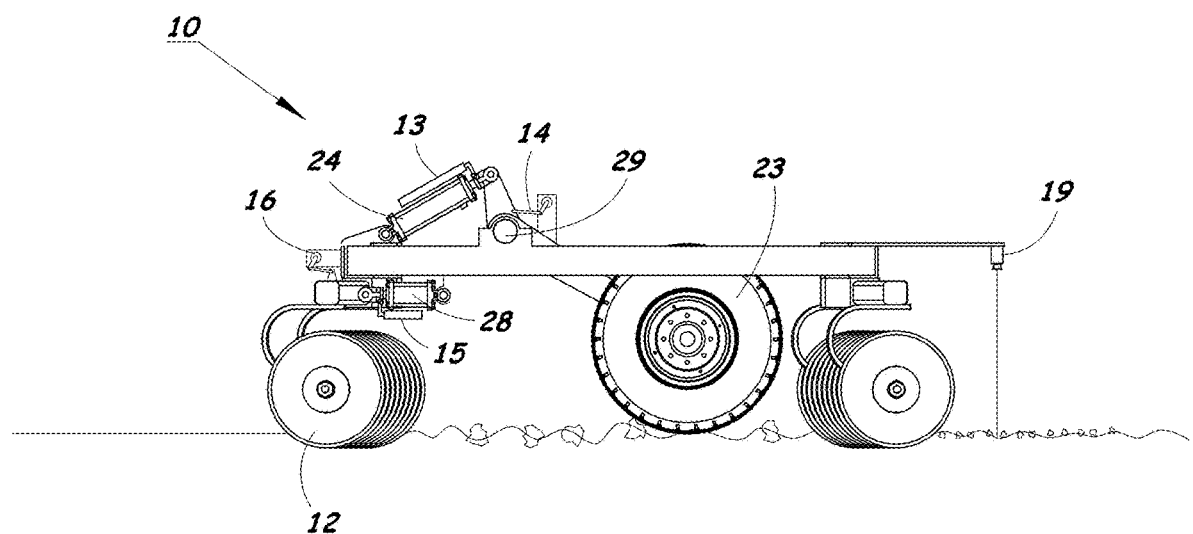
FIG. 5 is an elevation view of a tillage implement having an ultrasonic/laser sensor mounted to a rear of the implement for measuring surface roughness behind the soil engaging tools, and various potentiometer sensors for monitoring adjustable settings of the implement.

As illustrated in FIG. 5, the implement 10 can include additional sensors and adjustment mechanisms to monitor and adjust tillage settings and surface conditions. For example, in addition to the laser or ultrasonic sensor 19 provided at the rear of the implement 10, sensors 13-16 can be provided to detect and monitor the adjusted settings of the implement. The angle of the gang 12 can be adjusted by a hydraulic cylinder 28. A rockshaft 29 and hydraulic cylinder 24 are provided for adjusting the tillage depth of the implement 10. The cylinder linear potentiometer 13 or rockshaft angle potentiometer 14 are arranged to determine and monitor the position of the rockshaft 29 for adjusting tillage depth. An angle setting for the gang 12 of tillage tools can be determined and monitored by the gang angle potentiometer 16 or the cylinder linear potentiometer 15.

Figure 6:
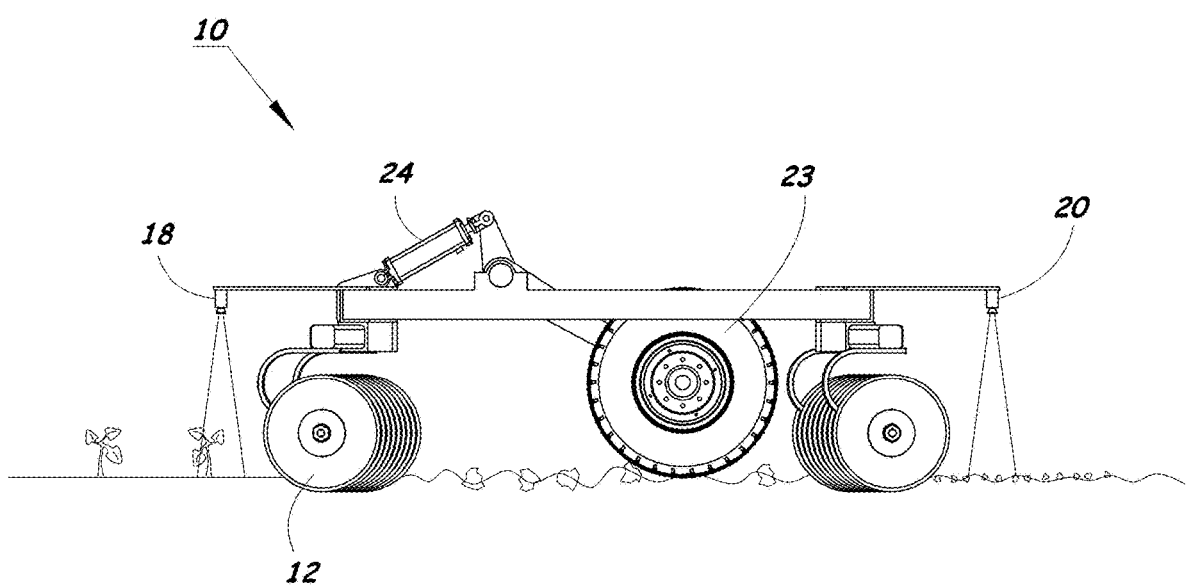
FIG. 6 is an elevation view of a tillage implement having a front optical sensor for measuring surface residue or weeds ahead of a tillage tool, and a rear optical sensor for measuring surface residue or weeds behind the tillage tool.
Figure 7:
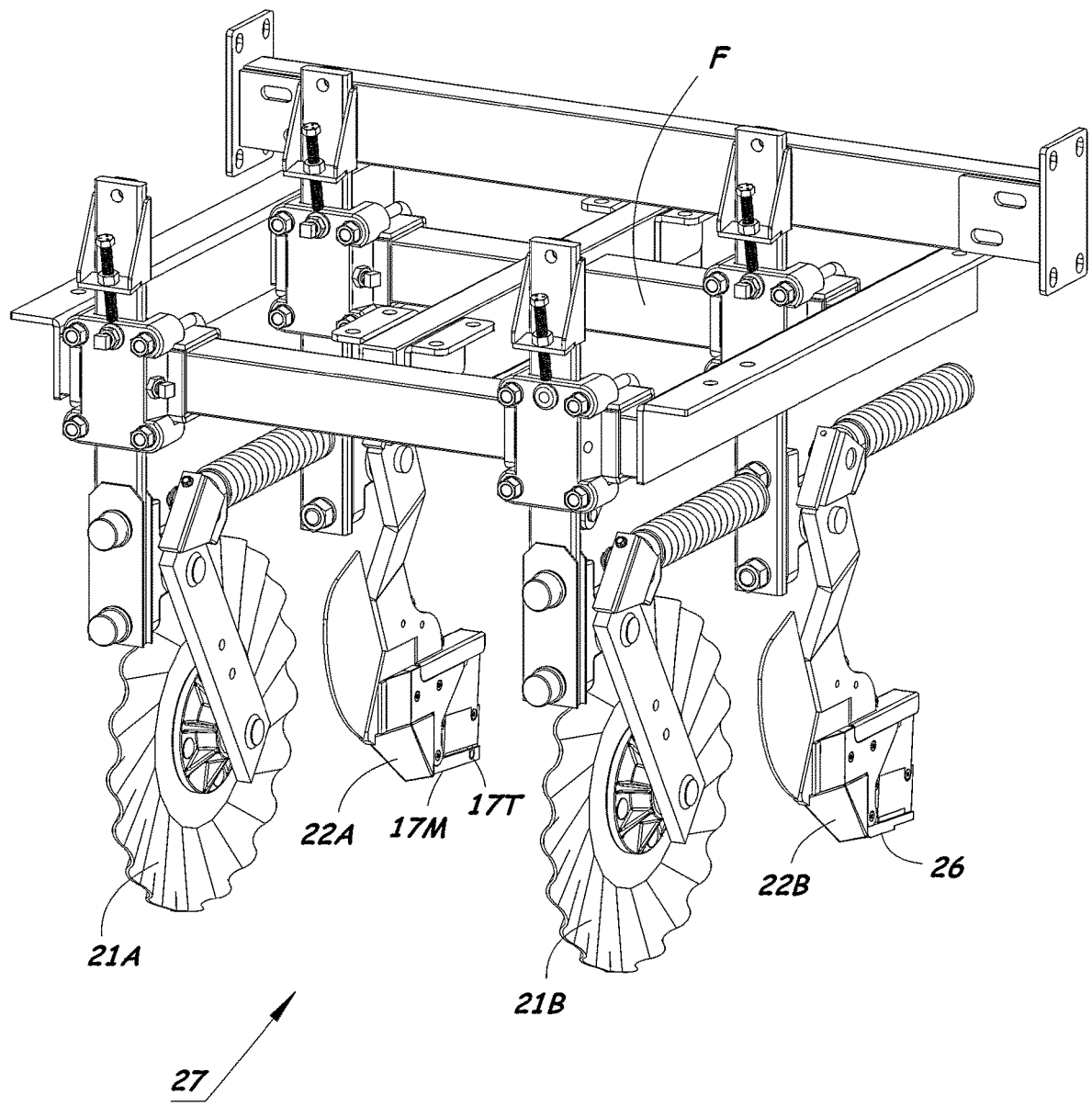
FIG. 7 is a detail view of the square electrode array shown in FIG. 1 for measuring soil EC.

As illustrated in FIG. 6, the control system of the present invention has above ground sensors 18, 20, such as cameras or other optical sensors, to detect and measure surface conditions ahead of and behind the implement 10. The surface condition data can be provided to the controller 11 for use in adjusting the implement setting. For example, in an implement with a soil engaging tool 12 for performing tillage, the first optical sensor 18 is arranged to measure and determine a percentage of soil and plant material visible prior to a tillage pass (i.e., ahead of the soil engaging tool 12), and a second optical sensor 20 is arranged to measure and determine a percentage of soil and plant material subsequent to the tillage pass (i.e., behind the soil engaging tool 12). The controller 11 receives data from the first and second optical sensors 18, 20 and provides decision support for the control system 11 to adjust the implement setting based on the data. The use of above ground optical sensors 18, 20, such as cameras, tuned to investigate above ground soil and plant material amounts for tillage adjustments, is unique to the present invention.

As with other embodiments described herein, a number of different implement settings can be monitored and adjusted by the control system 11 using data from the optical sensors 18, 20. These include the depth of the soil engaging tool, gang angle, speed, down pressure, implement angle, aggressiveness, pitch, and the like.

As illustrated in FIGS. 2 to 6, various sensors can be provided on the implement to monitor and measure effects of adjustments to implement settings, including soil moisture, temperature, tillage depth, surface roughness, cloddiness, seedbed compactness and evenness. These sensors can include, for example, a laser 19 or other beam interruption device, a camera 20, or a mechanical device used to determine surface roughness and cloddiness. As with the other sensors, the controller 11 will receive and use data from these sensors to provide decision support for the control system 11 to adjust the implement setting to achieve a desired surface roughness/cloddiness. For example, in fall tillage an operator may desire a higher amount of surface roughness to trap snow and other precipitation and/or reduce wind erosion over the winter, while spring tillage may need to leave a smoother surface to prepare fields for planting.

Additional sensors can be used in combination with the sensors for measuring surface roughness and cloddiness. These additional sensors include sensors 13-16 for monitoring implement settings (e.g., proximity sensors, potentiometers, ultrasonic sensors, and optical sensors), and various sensors for measuring soil EC, soil compaction, soil temperature, soil pH, soil organic matter, and soil moisture. The controller 11 receives and uses data from these additional sensors to provide decision support for the control system to adjust the implement setting. The controller 11 can also receive and use climate and historical weather data to provide decision support for the control system to adjust the implement setting.

Square or Modified Square Array for Soil EC

The electrode array 27 used in the present invention is illustrated in FIGS. 1 and 7 to 9. The electrode array 27 is part of a sensor assembly that can be mounted integrally into a farm implement or attached separately to a tractor, including a front 3-point hitch. The electrode array 27 includes two independent disk coulters 21A, 21B arranged side-by-side followed by two independent soil engaging runners 22A, 22B. The two coulters 21A, 21B and the two runners 22A, 22B are electrically isolated from each other. The two coulters 21A, 21B and the two runners 22A, 22B are arranged in a square or slightly rectangular configuration to provide four electrodes of a square or modified square array for measuring soil electrical conductivity (EC). The square or modified square electrode array 27 of the present invention provides a better fit on most tillage implements than the inline or transverse electrode arrays previously used for soil EC measurements.

The four electrode system can be in the form of two halves or pairs. One disk coulter and runner pair 21A, 22A has a moisture-temperature sensor 17M, 17T, and the other disk coulter and runner pair 21B, 22B has an optical sensor 26. The pairs can be used separately to perform individual functions, or together to perform EC measurement and optical, moisture and temperature measurements.

The first soil engaging runner 22A comprises the moisture sensor 17M and the soil temperature sensor 17T. The moisture sensor 17M can be in the form of a capacitance circuit connected to the first soil engaging runner 22A so that the electrode of the first soil engaging runner 22A can be used to measure soil moisture. Alternatively, the moisture sensor 17M can have its own soil engaging electrode connected to the capacitance circuit for measuring soil moisture separate from the electrodes of the soil EC array 27. The second soil engaging runner 22B includes the optical sensor 26 for measuring soil organic matter (OM).

The first and second runners 22A, 22B are attached to a frame F of the implement using a swing arm shank 30. A spring-loaded downforce mechanism 31 is provided to reduce damage and wear to the first and second soil engaging runners 22A, 22B, particularly the optical sensor 26. The downforce mechanism 31 provides a constant downforce to press the runners 22A, 22B against the soil, while allowing the runners 22A, 22B to flex upwardly when encountering stones and other hard or abrasive materials to reduce damage and wear.

Normalizing soil EC and OM measurements are feasible with the addition of soil moisture and temperature sensors 17M, 17T. This will be more critical when collecting optical and EC data on a farm implement due to data shifts from working the field in pieces over a period of time. The combination of using a square or modified square EC array to measure soil EC, together with optical, moisture and temperature measurements, and using such soil EC, optical, moisture and temperature measurements to control implement settings is unique to the present invention.

As illustrated in FIG. 8, an additional pair of disk coulters 32A, 32B can be provided with the electrode array 27 to measure soil EC at a different depth. For example, by positioning the additional pair of disk coulters 32A, 32B relatively close to the first pair of disk coulters 21A, 21B of the electrode array 27 (as compared to the sensor modules/ electrodes 22A, 22B that trail behind the first pair of disk coulters 21A, 21B), a soil EC reading at a relatively shallow depth can be provided by the additional pair of disk coulters 32A, 32B.

The controller 11 includes a first signal processing circuit for using the square or modified square electrode array 27 for measuring soil EC at a relatively deep depth, and a second signal processing circuit for using the first pair of electrodes 21A, 21B of the square or modified square electrode array, together with the additional pair of disk coulters 32A, 32B, for measuring soil EC at a relatively shallow depth. A micro controller, computer or data logger is provided for converting, processing and storing the sensor data received from the signal processing circuits.

Figure 9:
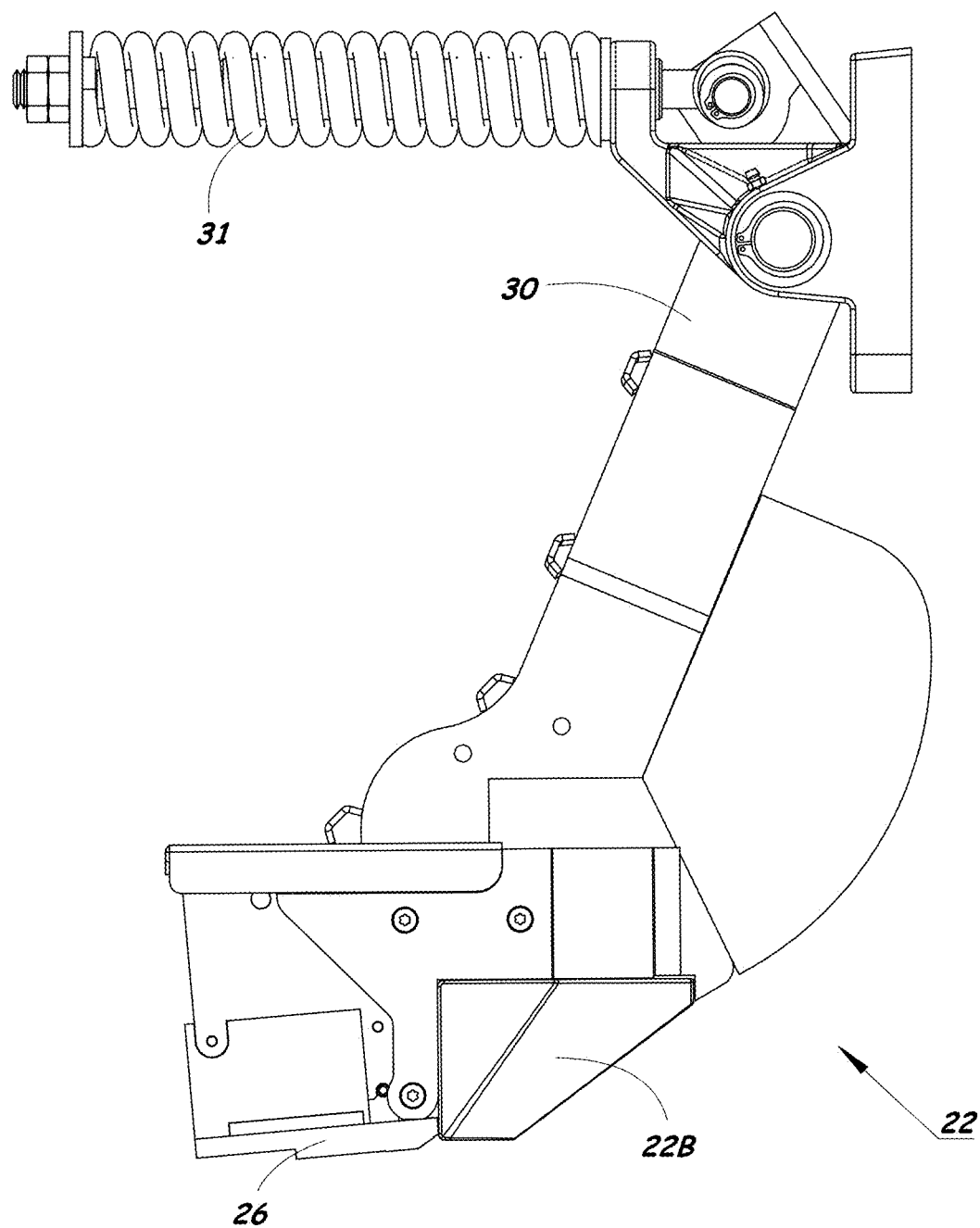
FIG. 9 is an elevation view of a sensor assembly with an interchangeable sensor module that can be equipped with either an optical sensor or a moisture and temperature sensor for use with the square electrode array.

As illustrated in FIG. 9, the sensor assembly 22 used in the tillage implement can be in the form of an interchangeable sensor module equipped with either an optical sensor 26 or a moisture and temperature sensor 17M, 17T. The sensor modules 22 are used as the trailing runners 22A, 22B in the square electrode array 27.

Figure 10:
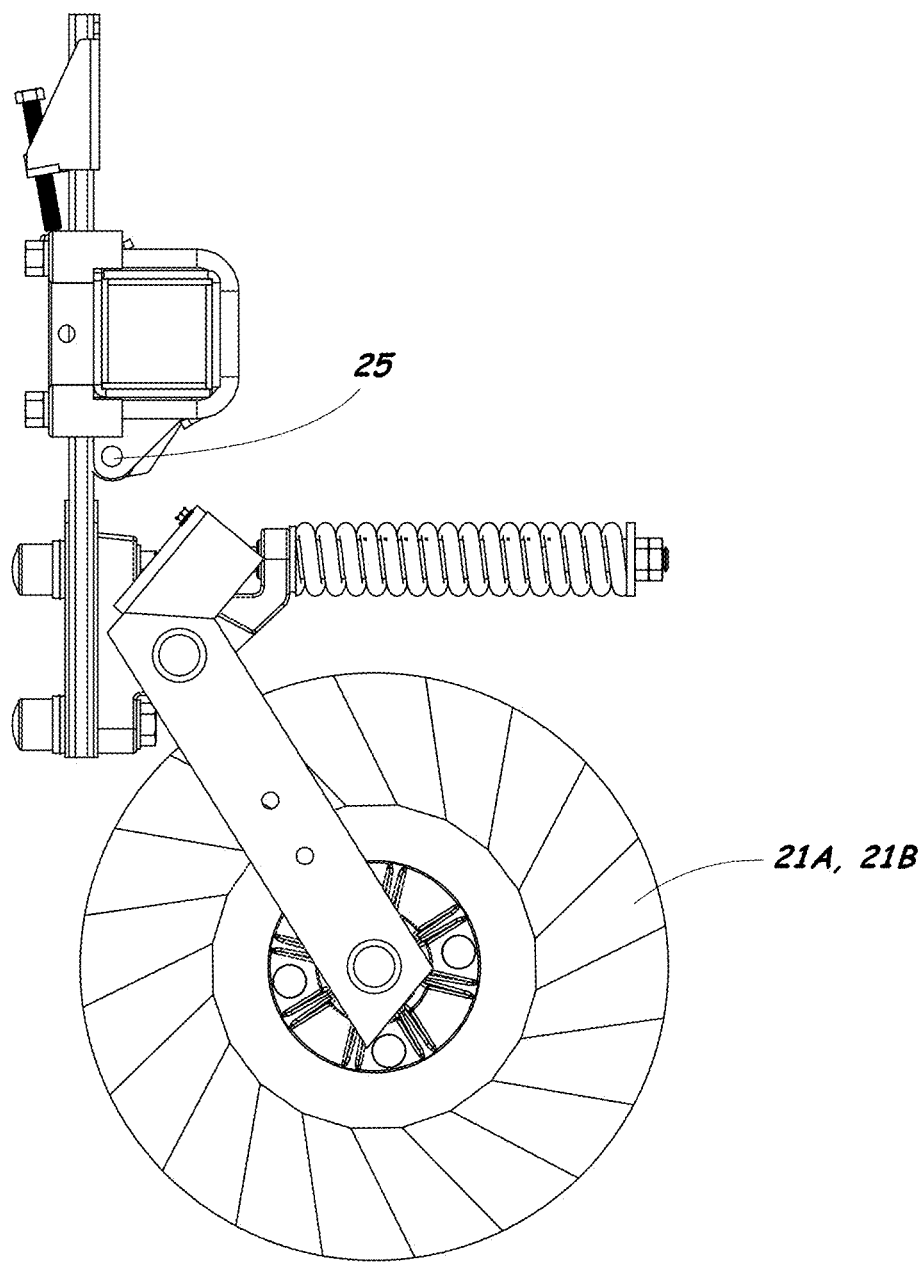
FIG. 10 is an elevation view of a rolling coulter having a mounting assembly equipped with a pressure pin to provide a soil compaction measurement.

As illustrated in FIG. 10, a first pressure pin 25 is associated with one of the disk coulters 21A, 21B, 32A, 32B to provide a compaction measurement at a first depth. A second pressure pin 25 may be associated with a second one of the disk coulters 21A, 21B, 32A, 32B to provide a compaction measurement at a second depth. The first and second disk coulters can be set to operate at different depths so that the first and second pressure pins 25 provide compaction measurements at two different depths. Alternatively, the pressure pins 25 can be mounted on individual disk coulters (not part of the soil EC array) operating at various depths. The combination of using soil compaction sensing with soil EC, optical, moisture and temperature measurements to control implement settings is unique to the present invention.

Figure 11:
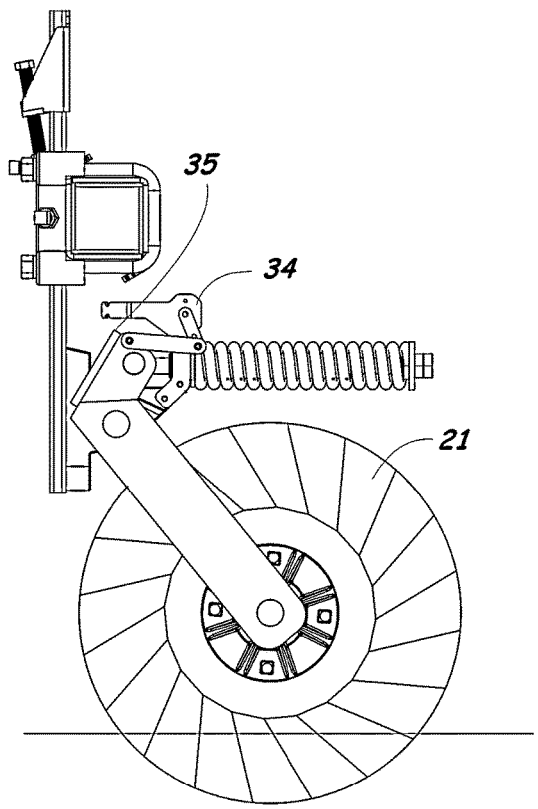
FIGS. 11 and 12 are elevation views of a rolling coulter having a mounting assembly equipped with a position sensor in the form of a potentiometer to provide a compaction measurement.
Figure 12:
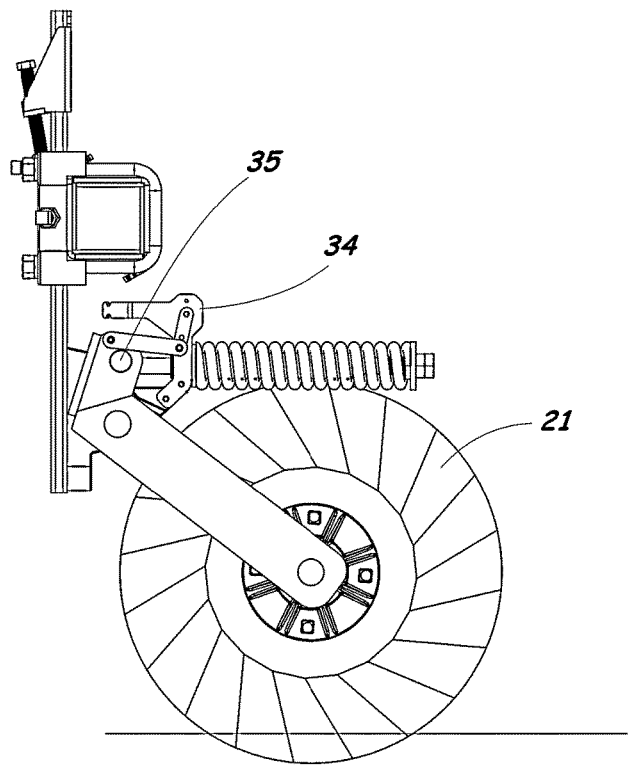

As illustrated in FIGS. 11 and 12, a position sensor or deflection sensor 34 associated with the mounting assembly 35 for the disk coulter 21 can be used for measuring travel or deflection of the mounting assembly 35 or the disk coulter 21 or other soil engaging component to provide a compaction measurement. The position sensor 34 can be in the form of a potentiometer. The potentiometer 34 is connected to a part of the mounting assembly 35 that moves with changes in the operating depth of the disk coulter 21, which correlates with the compaction level encountered in the soil during operation.

Soil Sensors for Cultivator Sweeps

Figure 13:
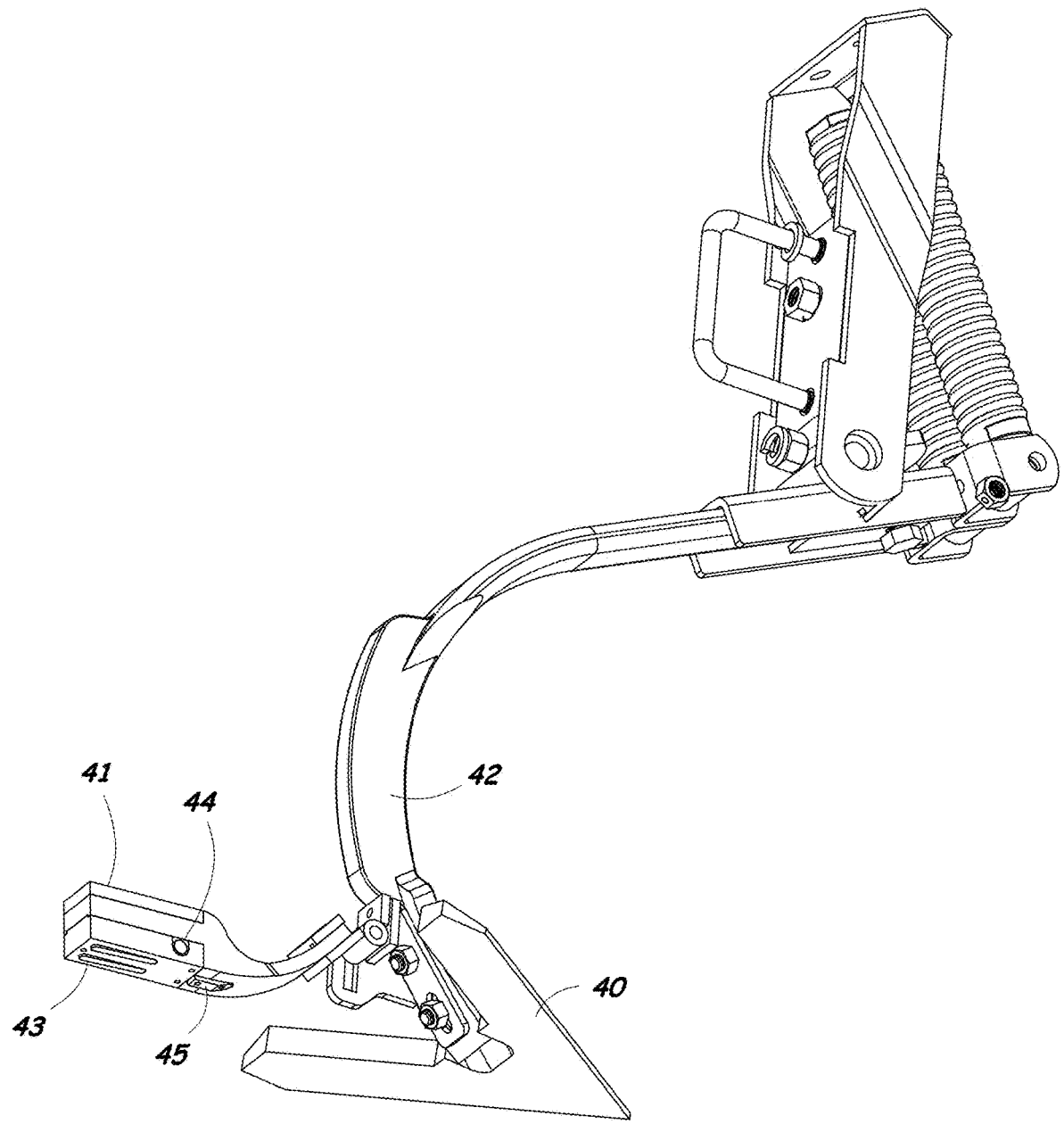
FIG. 13 is a perspective view of a cultivator shank and sweep with a soil sensor device mounted to the shank to follow behind the sweep.
Figure 14:
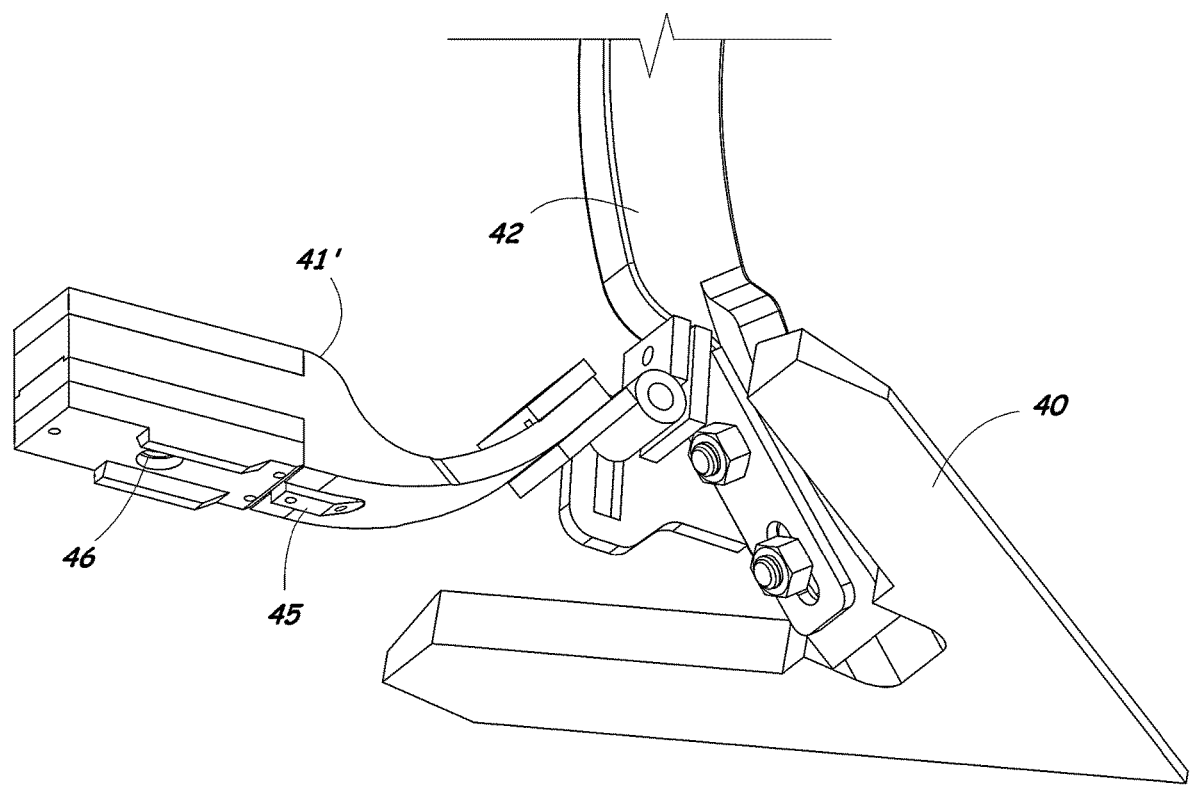
FIG. 14 is a detail perspective view of the cultivator shank and sweep with a different soil sensor device mounted to the shank to follow behind the sweep.
Figure 15:
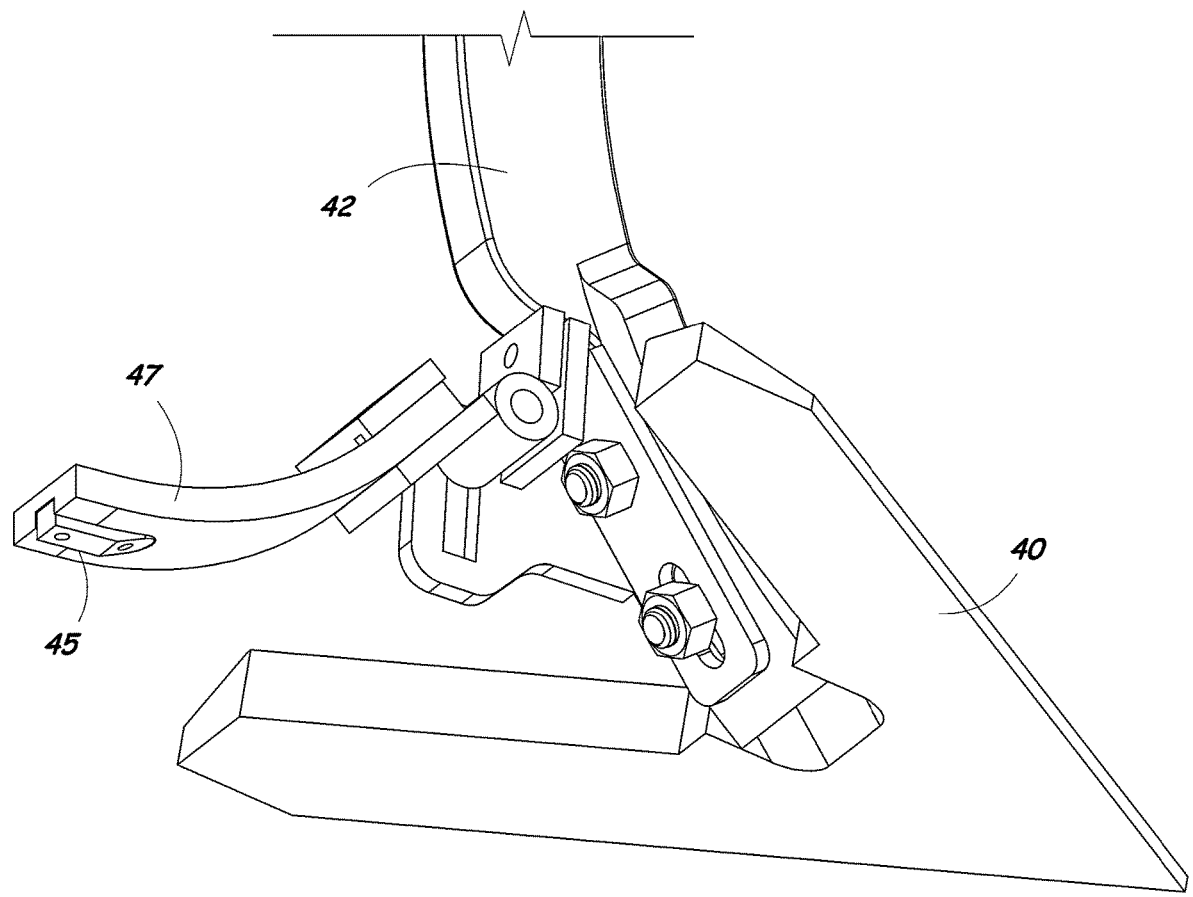
FIG. 15 is another detail perspective view of the cultivator shank and sweep with an soil EC sensing electrode mounted to the shank to follow behind the sweep.

As illustrated in FIGS. 13 to 15, the present invention can be used in a tillage implement with sweeps 40, such as a field cultivator, by attaching a soil sensing device 41 to the shank 42 on which the sweeps 40 are mounted. In this embodiment, the soil sensing device 41 is arranged to follow and engage soil behind the field cultivator shank 42. The tillage implement can have a plurality of such field cultivator shanks 42 and cultivator sweeps 40 spaced across the width of the implement and staggered in multiple rows in a known manner.

The soil sensing device 41 has multiple sensors for measuring various soil properties. The soil sensing device 41 shown in FIG. 13 includes a moisture sensor 43 with a pair of contacts for measuring soil moisture, a temperature sensor 44 for sensing soil temperature, and an electrode 45 that forms part of an array for measuring soil EC. The soil sensing device 41' shown in FIG. 14 includes an optical sensor 46 with a window for sensing soil OM and another electrode 45 of the array for measuring soil EC. As illustrated in FIG. 15, the electrode 45 for measuring soil EC can also be mounted by itself on a flexible plastic leaf spring 47 attached to the field cultivator shank 42.

Other Implements

As mentioned above, the present invention can be applied to implements other than tillage implements. For example, FIG. 16 illustrates a fertilizer applicator 50 with a sensor array 51 for measuring long term and temporal soil properties. FIG. 17 illustrates an agricultural seeder 60 with a sensor array 61 for measuring long term and temporal soil properties. The concepts described herein for monitoring and adjusting soil engaging tools based on measured long term and temporal soil properties can be applied to these implements 50, 60.

Control System

The control system includes a controller with a CPU that reads, displays and logs data from the first, second and third sensors. The controller includes a program with a decision support algorithm that allows an operator to set thresholds for field conditions and alerts the operator when such thresholds are met based on data from the first, second and third sensors. Alternatively, the thresholds for adjusting the implement can be preset for the operator's convenience, or a predetermined adjustment prescription can be programmed into the controller to optimize the implement's performance under changing conditions.

The controller can also include a program with a decision support algorithm that uses machine learning based on individual historical operator adjustments or based on a global database of other soil measurements and equipment settings across a region. For example, all conditions, adjustments and measured field properties can be recorded in a database. Machine learning techniques are then used to mine the database of soil readings and equipment adjustments to optimize and automate subsequent adjustments. The database can be from the grower's own implement or from multiple implements across a region. For example, the machine learning can use air and soil temperature data recorded from previous tillage or planting passes, along with forecasted air temperature and other weather phenomena, to model expected soil temperature. For another example, the machine learning can incorporate soil moisture data recorded from previous tillage or planting passes, along with estimated and measured precipitation amounts and other weather phenomena, to model expected soil moisture.

Figure 18:
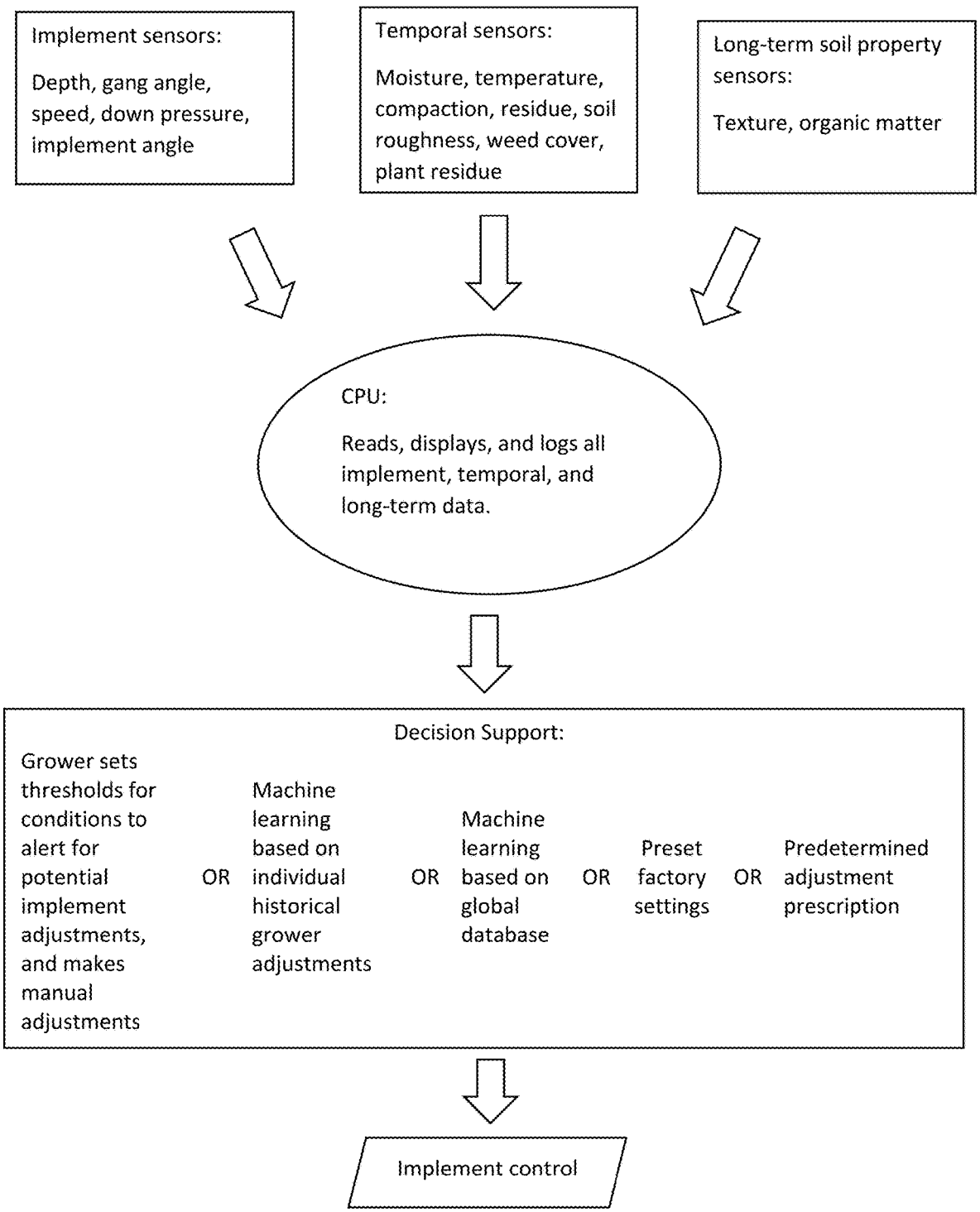
FIG. 18 is a diagram showing the use of implement sensors, temporal sensors, and long term soil property sensors to generate data for a CPU to use in providing decision support for controlling adjustable settings of an implement.
Figure 19:
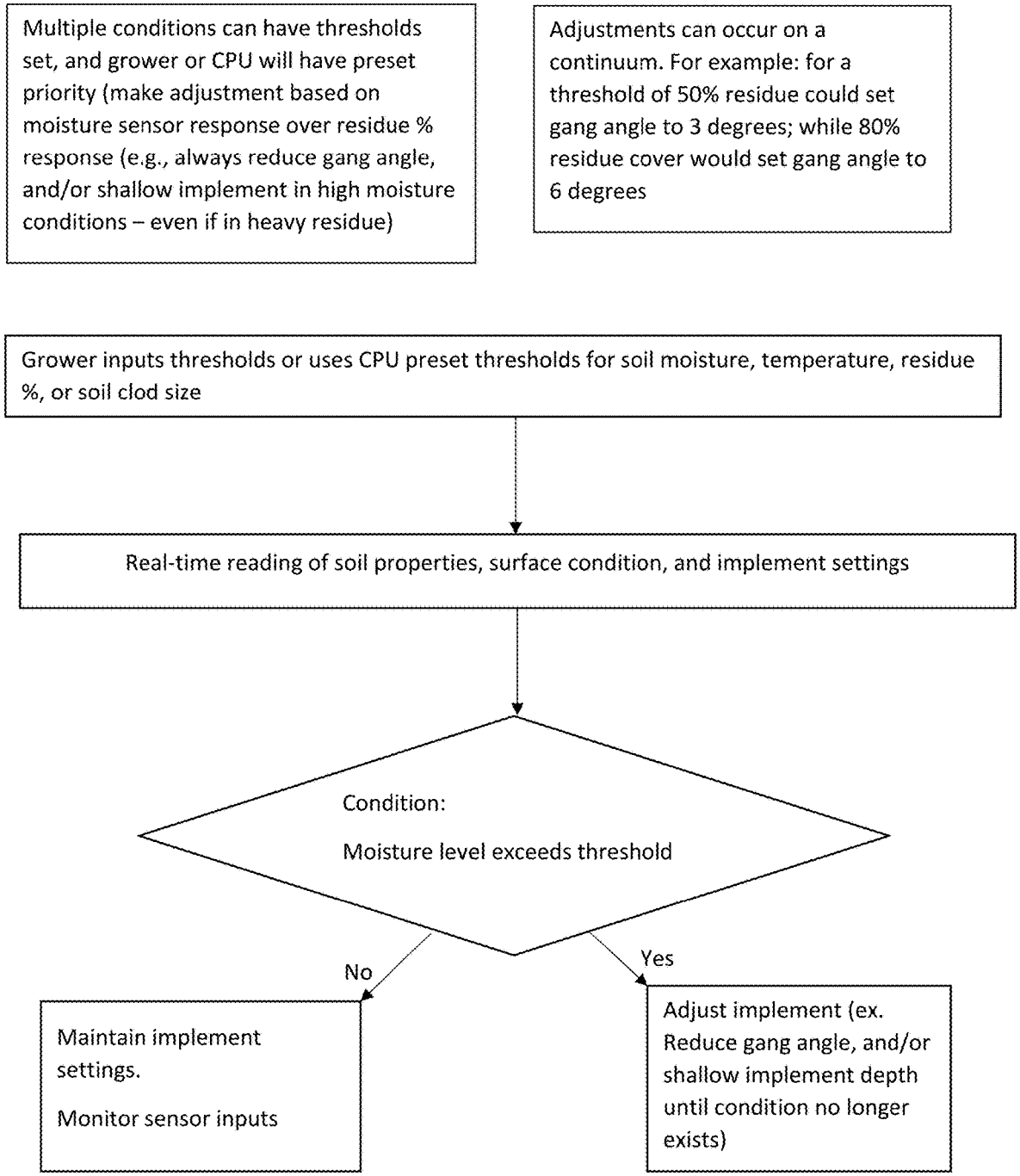
FIG. 19 is a diagram showing a decision making process for an implement controller that uses grower input thresholds or preset thresholds and real time reading of soil properties, surface conditions, and implement settings to adjust the implement to match changing field conditions.

As depicted in FIGS. 18 and 19, the controller is programmed with a decision support algorithm. The algorithm can use preset thresholds for field conditions, or the controller can allow an operator to set desired thresholds for field conditions. The controller can then either alert the operator when such thresholds are met based on data from the first and second optical sensors, or the controller can make automatic adjustments of the implement settings to achieve the desired optimized field operations and implement settings. The controller can also use a predetermined adjustment prescription programmed into the system by the operator to adjust the implement setting based on data from the first and second optical sensors and based on field conditions in real time to optimize implement performance.

Figure 20:
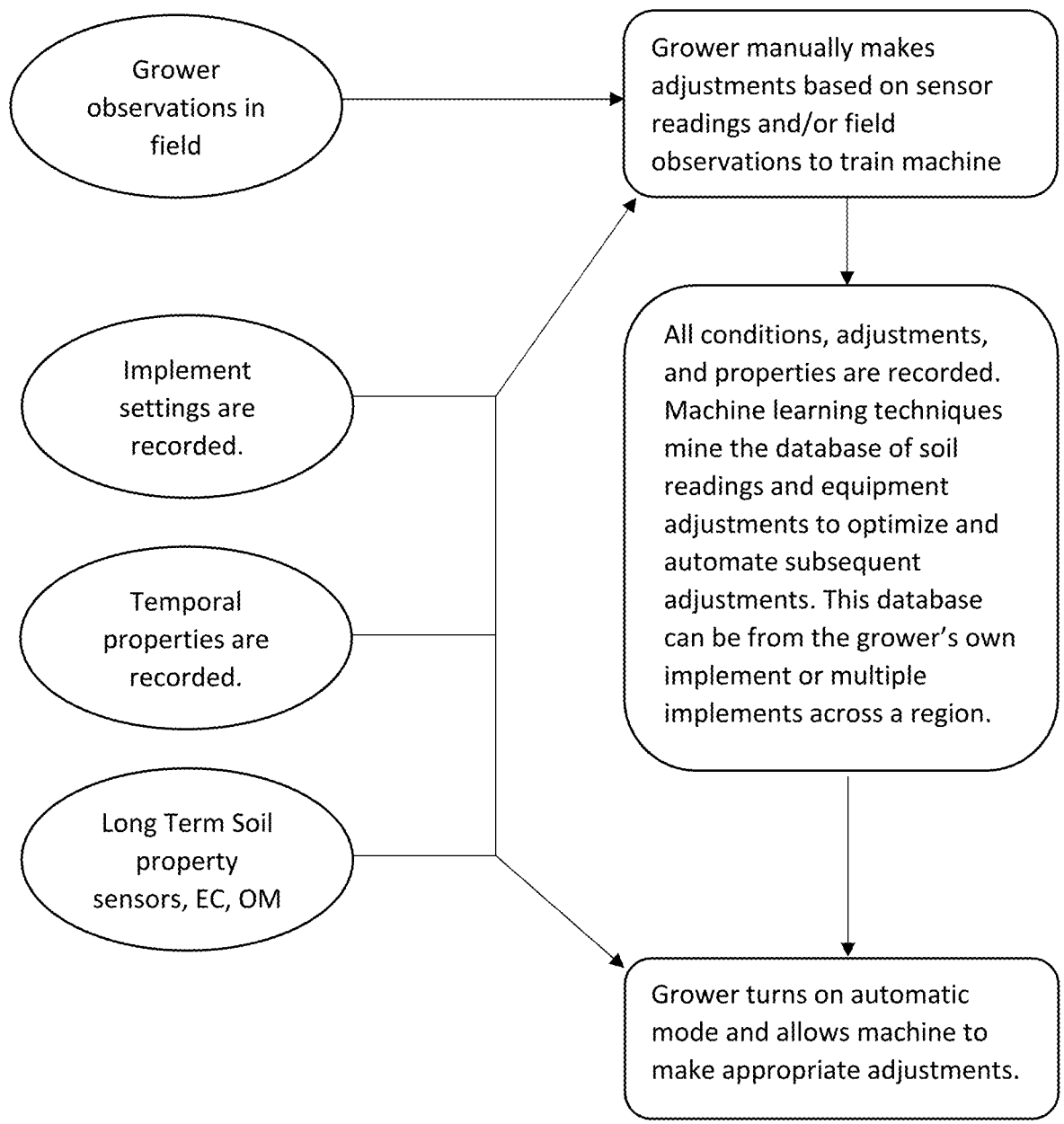
FIG. 20 is a diagram showing a machine learning process for the implement controller, which records conditions, adjustments, and properties during a manual control period, and then uses machine learning techniques to mine the database of soil readings and equipment adjustments to optimize and automate subsequent adjustments.

Alternatively, the controller can use machine learning, as depicted in FIG. 20. For example, the controller can be programmed with an algorithm that uses machine learning to adjust the implement setting based on data from the first and second optical sensors 18, 20 to optimize implement performance based on field conditions in real time. The machine learning can be based on individual historical operator adjustments (e.g., how the same implement was adjusted by the operator in similar field conditions), or the machine learning can be based on a global database of adjustments made by other operators in similar field conditions.

All measurements with the present invention (including in soil measurements, above soil measurements, and implement settings) are georeferenced and logged in the control system to allow decision support for adjusting the implement settings to be provided in real time based, in part, on the position of the implement in the field.

By measuring simultaneous soil temperature, soil moisture, and air temperature along with other field information, such as residue cover, each time a grower performs field work, and geo-referencing and recording the measured data, the control system can generate highly accurate and reliable modeling of soil moisture and temperature using available weather and precipication data. The use of above-ground optical devices, such as cameras, to investigate above ground soil and plant material amounts, in combination with soil EC, optical, moisture or temperature measurements, for determining when to make tillage adjustments, is unique to the present invention.

Figure 21:
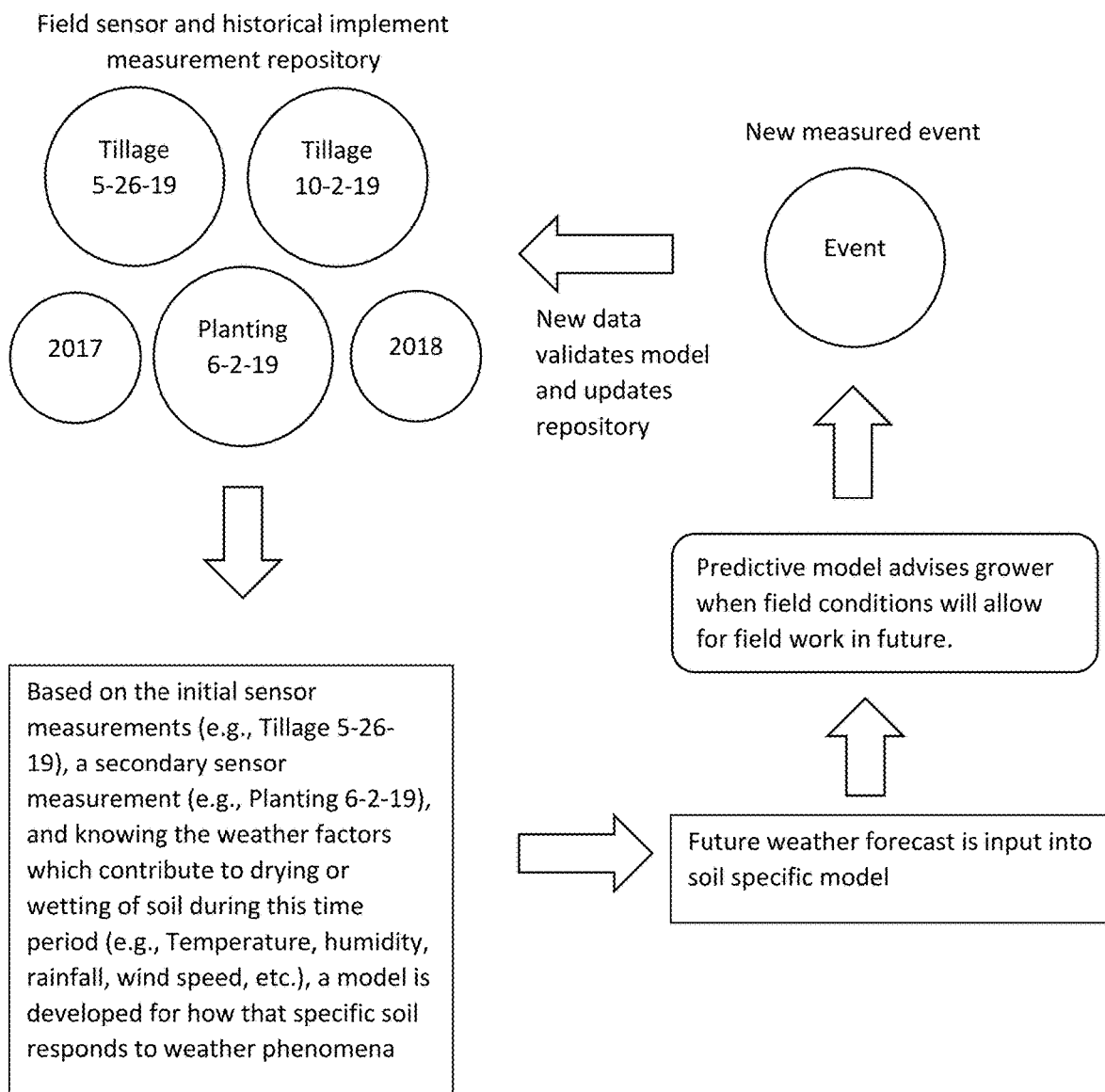
FIG. 21 is a field readiness flowchart that shows a process of using measured soil properties from previous field operations, along with weather forecast data, to predict when field conditions will allow for field work in the future.

The present invention provides an improved monitoring and control system for adjusting implement settings for tillage, fertilizing and seeding operations by using a combination of soil and climate sensing, historical weather data, grower adjustments, and machine learning to: (1) set warning thresholds, (2) adjust automatically based on an individual's adjustments, (3) record and collect a global set of those adjustments for automatic control, or (4) advise grower on field readiness for various operations (as depicted in FIG. 21). Additional sensors can be developed for various soil properties, including both long term and temporal soil properties. The control system can also be used with other implements and other field operations. The control system can also use remote imagery and yield analyses to aid in determining optimal settings for the implement.

Example of Implement Control Using Machine Learning

Everyday growers are making decisions to determine which fields are ready for field work and how aggressive to work a field to do an adequate job of seed bed preparation or weed control. These decisions are made using the grower's knowledge of their fields, equipment capabilities, local weather forecasts, or simply their intuition. A machine learning algorithm can be used to harness this information to allow for more automatic decision making.

Several methodologies can be used to implement a successful machine learning approach. These include but are not limited to supervised, unsupervised, or active learning. An example machine learning algorithm for the present invention is illustrated in FIGS. 22 and 23 to produce optimal field conditions with a tillage implement.

Figure 22:
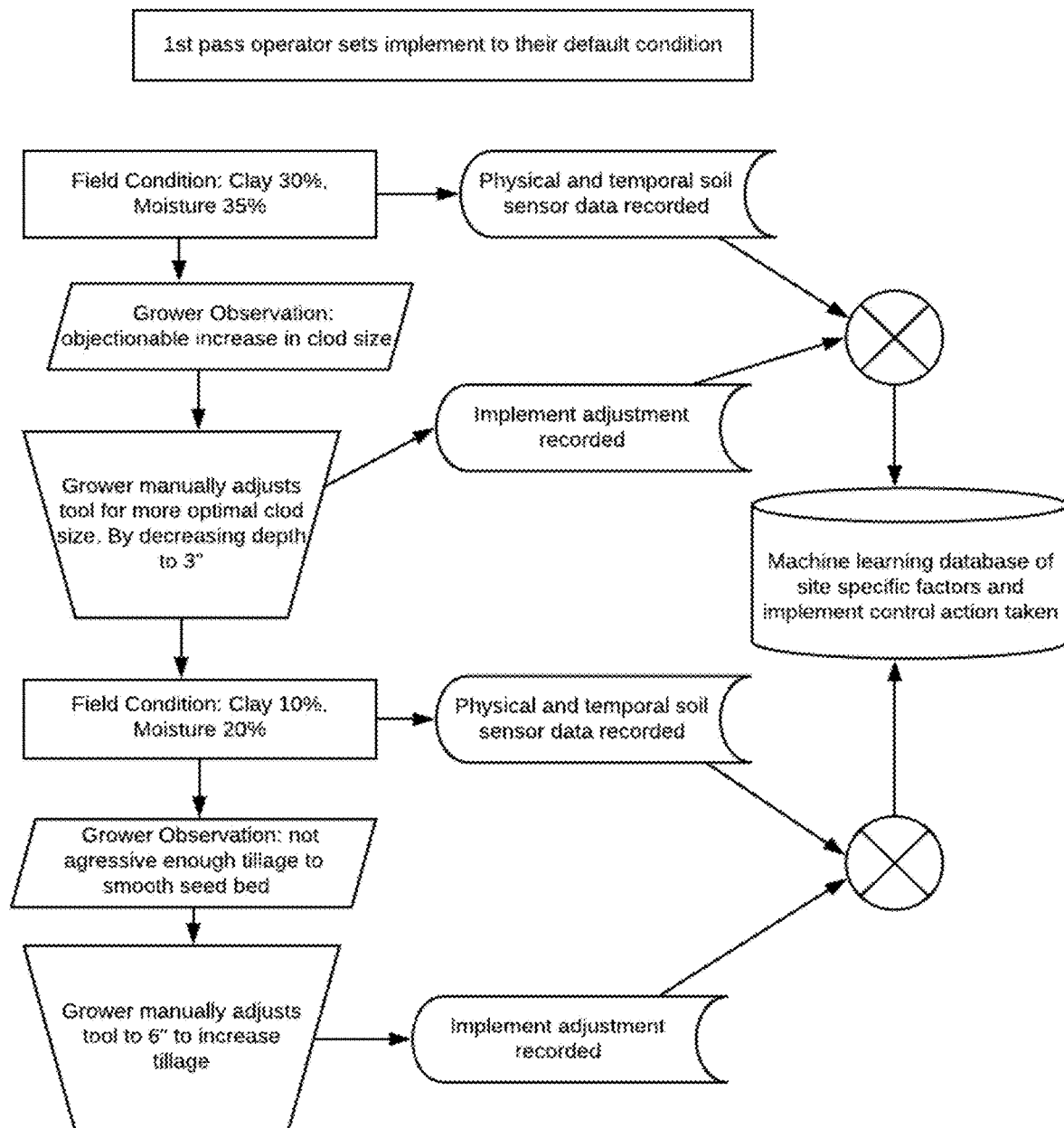

In FIG. 22, a flowchart of the machine learning process is illustrated for an operator's initial pass or passes through the field, during which manual adjustments are made to the tillage implement for varying soil and moisture conditions. For example, at the first data point the sensors determine that the soil has 30% clay content and 35% moisture. These soil conditions are georeferrenced and recorded in the machine learning database. If the grower observes an objectionable increase in clod size while operating in those soil conditions, he may manually adjust the tillage tool to a less aggressive setting (e.g., shallower depth). This manual implement adjustment is also recorded in the machine learning database. At a later data point, the sensors determine that the soil has 10% clay content and 20% moisture. These soil conditions are georeferenced and recorded in the database. At that time, the grower may observe that the tillage implement is not set aggressively enough to smooth the seed bed, and manually adjust the tillage tool to a more aggressive setting (e.g., deeper depth). This manual implement adjustment is recorded in the database. Such manual adjustments can be made based on the operator's view of the field, his expert knowledge gained by experience, and the soil sensor data available in real-time.

Figure 23:
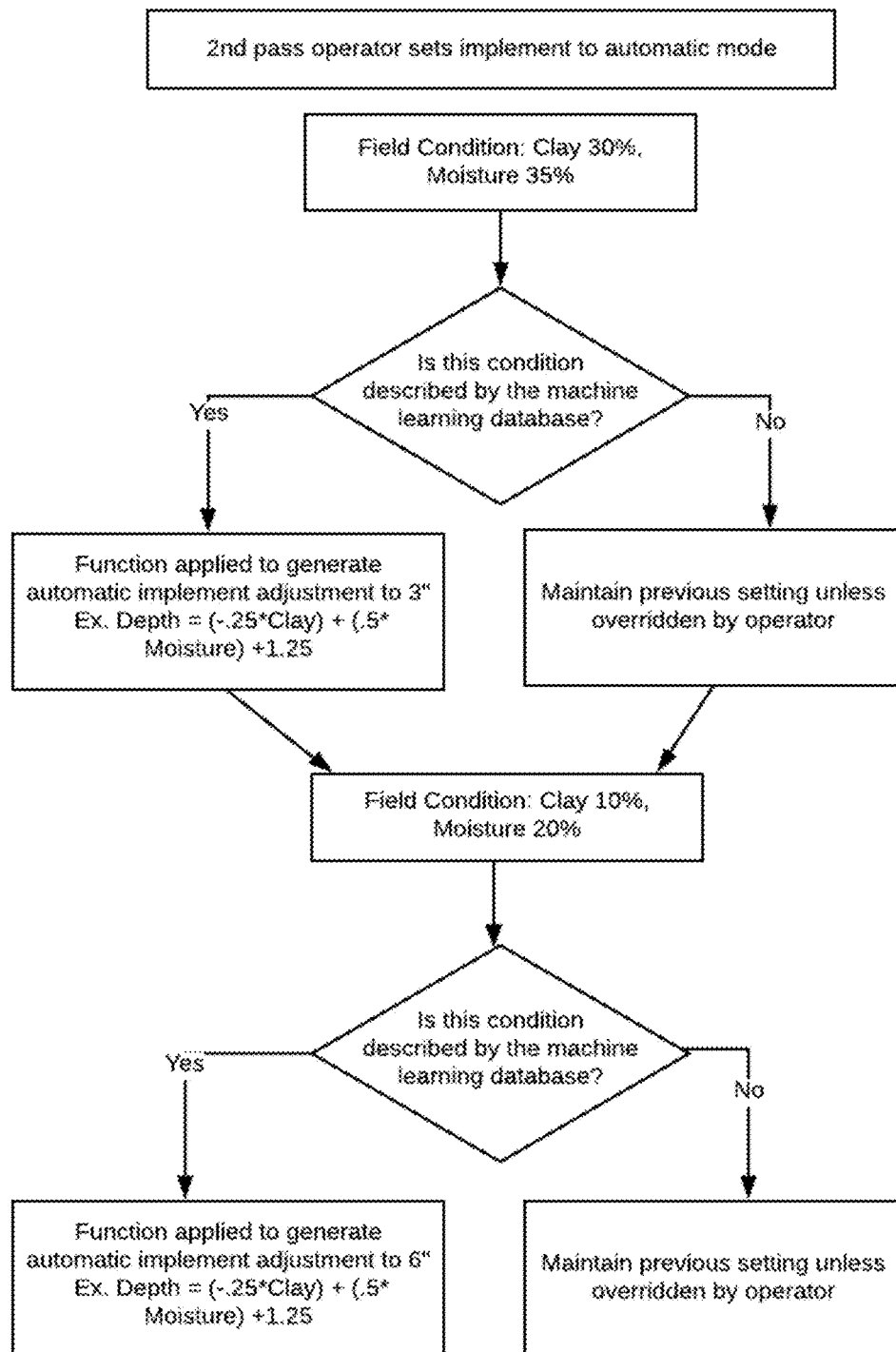

After learning the operator's preferences for tilling each soil condition, the operator turns control of the implement over to the automated system, as depicted in the flowchart of FIG. 23. In the automatic mode, the implement performs the adjustments automatically to adapt to varying soil conditions on subsequent passes through the field. For example, when the sensors determine that the soil has 30% clay content and 35% moisture at a point in the field, the controller will determine if this condition had been described by the machine learning database. If so, the controller will apply the same setting for the implement that was used by the operator during the machine learning mode, or according to a function created to generate a suitable implement adjustment setting based on the data collected during the machine learning mode. If the condition was not previously described by the machine learning database, the previous setting of the implement will be maintained unless overridden by the operator. Similarly, if the sensors determine that the soil has 10% clay content and 20% moisture at a point in the field, the controller will determine if this condition had been described by the machine learning database. The controller will continue to repeat this process at each data point as the implement passes through the field.

On subsequent fields, the operator may repeat the learning process or allow the machine to use the settings it learned on the initial field.

Soil and implement adjustment data collected over multiple fields, farms, and years can be used within a machine learning algorithm to determine overall most common preferences. These can be interpreted as best management practices and applied subsequently without any training set from that field or farm.

In another example, a grower may decide to work a soil with 40%+clay content and 35%+moisture less agressively (shallow depth, less implement gang angle) to prevent large soil clods from forming. An implement equipped with a long term soil property sensor (e.g., a soil EC sensor to determine soil texture), a temporal sensor (e.g., a soil moisture sensor), and implement setting sensors (e.g., tillage depth sensor and gang angle sensor) could make this adjustment when these conditions are preseent. However, in practice the grower may notice these conditions sometimes contain heavy weed cover, and decide to till these areas more aggressively to optimize weed control. An implement equipped with a camera to recognize weeds could actively learn this condition and be trained to make this same decision in the future.

The examples of the machine learning concept used in the present invention are described in the most basic terms above. However, it will be appreciated that there are a myriad of machine settings (e.g., gang angle, leveling intensity, depth, etc.), along with a myriad of soil properties (e.g., moisture, texture, soil temperature, residue coverage, weeds, clod size, topography, etc.), and each of these settings and properties can have their own functions and solutions. The solutions can be global and can be continually improving as additional data is acquired, such as crop growth and yield.

Machine learning in the present invention uses the long term and temporal soil sensors, coupled with implement sensing, for implements to be trained, tested, and tuned for optimal performance. This training can occur on a single implement pass, an entire field, an entire farm, or a region. Local, regional, or global models can then be developed from the traininig to allow for real-time implement control. This process is adaptive to novel environments and conditions as these are encountered during training, making implements continually smarter to their surroundings.

While the invention has been described in connection with specific embodiments thereof, it is to be understood that this is by way of illustration and not of limitation, and the scope of the appended claims should be construed as broadly as the prior art will permit.

What is claimed is:

1. A method of controlling a tillage implement having a tillage tool, at least a first means for adjusting a setting of the tillage tool, at least one temporal soil property sensor, and at least one source of long term soil property data, comprising:
setting initial soil condition parameters for adjusting the tillage tool setting between a more aggressive tillage tool setting and a less aggressive tillage tool setting;
operating the tillage implement in a machine learning mode in which the tillage tool setting is adjusted based on data from said temporal soil property sensor, said long term soil property data, and manual overrides to the tillage tool setting based on operator preferences;
analyzing data from said temporal soil property sensor and said source of long term soil property data to determine conditions when manual overrides to the tillage tool setting occurred; and
operating the tillage implement in an automatic mode in which the tillage tool setting is automatically adjusted based on said analyzed data and based on data from said temporal soil property sensor and said long term soil property data.

2. The method according to claim 1, wherein said at least one temporal soil property sensor comprises a soil moisture sensor.

3. The method according to claim 1, wherein said tillage tool setting comprises a tillage depth and an angle of operation of the tillage tool.

4. The method according to claim 1, further comprising a surface camera for detecting weed cover, analyzing data from said surface camera to determine conditions when manual overrides to the tillage tool setting occurred, and automatically adjusting the tillage tool setting in said automatic mode based on data from said surface camera.

5. The method according to claim 1, wherein said initial soil condition parameters comprise soil moisture and soil texture conditions that are prone to large soil clods forming during aggressive tillage, and said less aggressive tillage tool setting comprises a shallower tillage depth and smaller angle of operation of the tillage tool than said more aggressive tillage tool setting.

6. A system for measuring at least one property of soil in a field, comprising:
a frame;
first and second disk coulters positioned side-by-side and mounted to said frame, said first and second disk coulters being electrically isolated from each other;
first and second soil engaging runners positioned side-by-side and mounted to said frame to follow behind said first and second disk coulters, respectively, said first and second soil engaging runners being electrically isolated from each other and from said first and second disk coulters; and
said first and second disk coulters and said first and second soil engaging runners being arranged in a rectangular pattern to provide four electrodes of a square or modified square array for measuring soil electrical conductivity.

7. The system according to claim 6, wherein said first soil engaging runner comprises a moisture sensor and a temperature sensor.

8. The system according to claim 6, wherein said second soil engaging runner comprises an optical sensor.

9. The system according to claim 6, further comprising a first compaction sensor associated with said first disk coulter to provide a compaction measurement at a first depth, said first compaction sensor being selected from the group consisting of a pressure pin, a travel sensor and a deflection sensor.

10. The system according to claim 9, further comprising a second compaction sensor associated with said second disk coulter to provide a compaction measurement at a second depth, said second compaction sensor being selected from the group consisting of a pressure pin, a travel sensor and a deflection sensor, wherein said first and second disk coulters are set to operate at different depths so that said first and second compaction sensors provide compaction measurements at two different depths.

11. The system according to claim 6, further comprising a first signal processing circuit for using said square or modified square electrode array for measuring soil electrical conductivity at a relatively deep depth, and a second signal processing circuit for using said square or modified square electrode array for measuring soil electrical conductivity at a relatively shallow depth.

12. The system according to claim 11, further comprising a micro controller, computer or data logger for converting, processing and storing sensor data received from said signal processing circuits.

13. The system according to claim 6, further comprising a signal processing circuit connected to said square or modified square electrode array for using at least one of said electrodes to measure soil moisture.

14. A method of controlling an agricultural implement having a soil engaging tool, at least a first means for adjusting a setting of the tool, at least one temporal soil property sensor, and at least one source of long term soil property data, comprising:
setting initial soil condition parameters for adjusting the tool setting between at least a first tool setting and a second tool setting;
operating the agricultural implement in a machine learning mode in which the tool setting is adjusted based on data from said temporal soil property sensor, said long term soil property data, and manual overrides to the tool setting based on operator preferences;
analyzing data from said temporal soil property sensor and said source of long term soil property data to determine conditions when manual overrides to the tool setting occurred; and
operating the agricultural implement in an automatic mode in which the tool setting is automatically adjusted based on said analyzed data and based on data from said temporal soil property sensor and said long term soil property data.

15. The method according to claim 14, wherein said at least one temporal soil property sensor comprises a soil moisture sensor.

16. The method according to claim 14, wherein said tool setting comprises a depth of operation of the tool.

17. The method according to claim 14, wherein said tool setting comprises an angle of operation of the tool.

18. The method according to claim 14, further comprising a surface camera for detecting weed cover, analyzing data from said surface camera to determine conditions when manual overrides to the tool setting occurred, and automatically adjusting the tool setting in said automatic mode based on data from said surface camera.

\* \* \* \* \*